: US 12,404,025 B2
(45) Date of Patent: Sep. 2, 2025

(54) PROTECTIVE MOISTURE DAM IN AN AIRCRAFT CABIN ASSEMBLY

(71) Applicant: The Boeing Company, Arlington, VA (US)

(72) Inventors: Erik Ivar Wiman, Everett, WA (US); Marat Denuski, Kenmore, WA (US)

(73) Assignee: THE BOEING COMPANY, Arlington, VA (US)

( * ) Notice: Subject to any disclaimer, the term of this patent is extended or adjusted under 35 U.S.C. 154(b) by 128 days.

(21) Appl. No.: 18/171,571

(22) Filed: Feb. 20, 2023

(65) Prior Publication Data

US 2024/0278918 A1 Aug. 22, 2024

(51) Int. Cl.
 B64D 11/02 (2006.01)
 B64D 11/04 (2006.01)

(52) U.S. Cl.
 CPC ............. B64D 11/02 (2013.01); B64D 11/04 (2013.01)

(58) Field of Classification Search
 CPC ..... F16L 5/00; F16L 5/10; H02G 3/22; B64D 11/02; B64D 11/04; B64C 1/18
 See application file for complete search history.

(56) References Cited

U.S. PATENT DOCUMENTS

| | | | |
|---|---|---|---|
| 2,441,206 A | 5/1948 | Pevney | |
| 2,542,046 A | 2/1951 | Mullett et al. | |
| 2,813,692 A * | 11/1957 | Peterson | H01B 17/306 277/606 |
| 5,083,727 A * | 1/1992 | Pompei | B64D 11/04 244/118.6 |
| 5,810,400 A | 9/1998 | Youngs | |
| 6,119,305 A * | 9/2000 | Loveall | H05K 9/0018 174/152 G |
| 7,723,622 B2 * | 5/2010 | Dukes | H02G 3/22 16/2.2 |
| 7,767,908 B2 | 8/2010 | Sylvan | |
| 7,810,847 B1 | 10/2010 | Cornwall | |
| D680,633 S | 4/2013 | Santiago | |
| 9,581,271 B2 | 2/2017 | Haynes et al. | |
| 11,320,067 B2 * | 5/2022 | Short | H02G 3/0456 |
| 2004/0208704 A1 | 10/2004 | Suyama et al. | |
| 2006/0181078 A1 | 8/2006 | Lauridsen | |
| 2007/0262212 A1 | 11/2007 | White | |
| 2008/0290610 A1 * | 11/2008 | Dukes | H02G 3/22 277/607 |

(Continued)

FOREIGN PATENT DOCUMENTS

| | | | |
|---|---|---|---|
| CA | 2441062 A1 | 3/2004 | |
| CA | 2896296 A1 * | 1/2017 | ............... F16L 5/10 |
| CN | 101611201 B | 7/2011 | |
| CN | 111173998 B | 4/2021 | |

(Continued)

OTHER PUBLICATIONS

EP Search Report mailed May 22, 2024 in re EP Application No. 23217599.2.

Primary Examiner — Benjamin P Lee
(74) Attorney, Agent, or Firm — COATS & BENNETT, PLLC

(57) ABSTRACT

Present aspects are directed to a protective moisture dam comprising a first and second retainer and a protective sleeve for preventing a moisture/fluid flow from progressing from an aircraft cabin monument floor to an adjoining compartment located beneath an aircraft cabin monument floor.

22 Claims, 17 Drawing Sheets

(56) References Cited

U.S. PATENT DOCUMENTS

| | | | |
|---|---|---|---|
| 2010/0269943 A1* | 10/2010 | Arai | F16L 5/00 |
| | | | 52/220.8 |
| 2012/0110780 A1* | 5/2012 | Rumsey | F16L 5/00 |
| | | | 29/433 |
| 2012/0297572 A1* | 11/2012 | Stewart | F16L 5/02 |
| | | | 16/2.2 |
| 2013/0099055 A1 | 4/2013 | Pfeiffer | |
| 2019/0157776 A1* | 5/2019 | Castillo | H01R 4/70 |
| 2020/0240558 A1 | 7/2020 | Genev | |
| 2021/0033222 A1* | 2/2021 | Short | F16L 5/14 |
| 2021/0126442 A1* | 4/2021 | Chung | F16J 3/041 |
| 2021/0234349 A1* | 7/2021 | Ehmann | H02G 3/22 |
| 2021/0359500 A1* | 11/2021 | Qumsieh | H02G 3/0691 |
| 2021/0371108 A1 | 12/2021 | Zager-Rode et al. | |
| 2022/0018466 A1* | 1/2022 | Coscarella | E04B 1/66 |

FOREIGN PATENT DOCUMENTS

| | | |
|---|---|---|
| CN | 112728226 B | 6/2022 |
| DE | 29910654 U1 | 11/1999 |
| DE | 202022103371 U1 | 7/2022 |
| EP | 2314903 B1 | 5/2017 |
| EP | 2679871 B1 | 10/2019 |
| EP | 4006397 A1 | 6/2022 |
| GB | 1005686 A | 9/1965 |
| GB | 2150650 B | 1/1987 |
| JP | H08247341 A | 9/1996 |
| JP | 2000002441 A | 1/2000 |
| JP | 2000110969 A | 4/2000 |
| JP | 3919318 B2 | 5/2007 |
| JP | 2018044612 A | 3/2018 |
| JP | 6837876 B2 | 3/2021 |
| KR | 200320366 Y1 | 7/2003 |
| WO | 2014125838 A1 | 8/2014 |

* cited by examiner

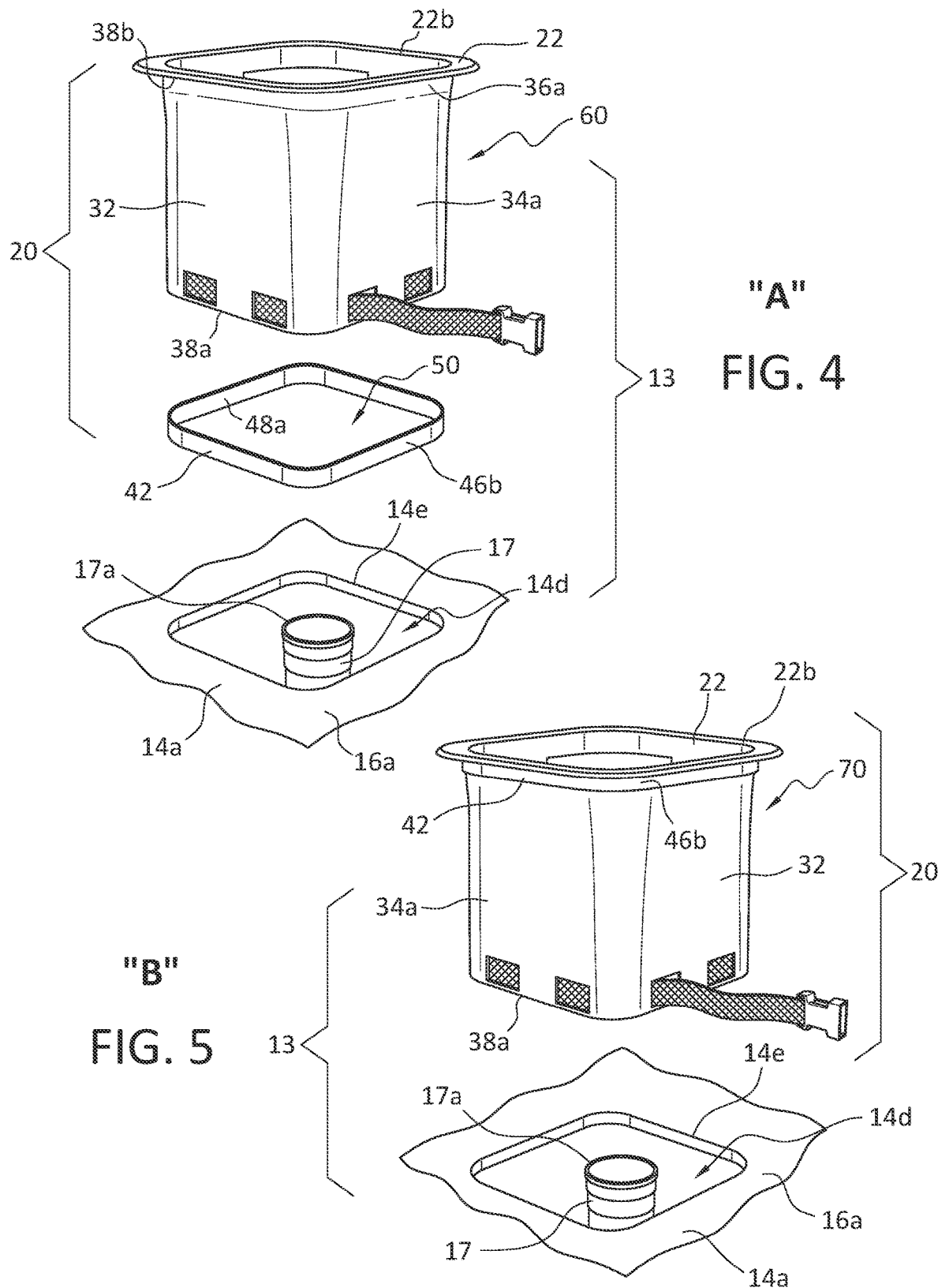

PROTECTIVE MOISTURE DAM IN AN AIRCRAFT CABIN ASSEMBLY

TECHNOLOGICAL FIELD

The present disclosure relates generally to the field of controlling and otherwise directing a moisture and/or fluid flow. More specifically the present disclosure relates to the field of apparatuses, systems and methods for preventing a moisture and or fluid flow on a flow from passing through an aircraft cabin floor assembly.

BACKGROUND

Passenger aircraft typically may have aircraft cabin floor sections within or near aircraft cabin monuments (e.g., aircraft cabin lavatory, aircraft cabin galley, etc.). Such aircraft cabin monuments may have access to or otherwise be in communication with, for example, a potable water supply, a non-potable water supply, a potable water holding tank, a wastewater holding tank, etc., via plumbing elements. For example, various plumbing elements (e.g., pipes, conduits, pumps, filters, traps, etc.) found in and/or below aircraft cabin monuments may be responsible for directing fresh water, potable water, etc., into, or responsible for directing gray water, potable water, wastewater, etc. away from an aircraft monument that can be an aircraft cabin lavatory (via e.g., a sink or toilet, etc.) or aircraft cabin galley (via e.g., a sink, etc.). Some plumbing elements may pass from ductwork located beneath a cabin floor through an opening in a cabin monument floor into a plumbing assembly that is housed within an aircraft cabin monument and located above the monument floor.

Equipment bays (e.g., electronics bays, other electrical or non-electrical components, etc.) that could be sensitive to the presence of moisture, water, etc., can be located in areas beneath cabin flooring and can be in a "flowing proximity" of moisture sources directed into or directed away from an aircraft monument. Such equipment bays, that can be located beneath a cabin floor, can become infiltrated with amounts of moisture (including amounts of water, wastewater, bilge, etc.) that may pass from an aircraft cabin monument through aircraft cabin monument floor openings and into sensitive equipment bays.

Unless explicitly identified as such, no statement herein is admitted as prior art merely by its inclusion in the Technological Field and/or Background section(s).

SUMMARY

According to present aspects, an aircraft cabin assembly is disclosed, with the aircraft assembly including an aircraft cabin floor with the aircraft cabin floor comprising an aircraft cabin floor first side that is exposed to the aircraft cabin, and an aircraft cabin floor second side, with the aircraft cabin floor further comprising an aircraft cabin floor through opening, with the aircraft cabin floor through opening extending through a thickness of the aircraft cabin floor from the aircraft cabin floor first side to the aircraft cabin floor second side, and with the aircraft cabin floor through opening comprising an aircraft cabin floor through opening perimeter. The aircraft cabin assembly further includes a moisture dam assembly, with the moisture dam assembly fixedly and removably attached to the aircraft cabin floor through opening perimeter. The moisture dame assembly includes a first retainer, with the first retainer including a first retainer wall, with the first retainer wall including a first retainer wall first side having a first retainer wall first side perimeter (referred to equivalently herein as a "first retainer wall first side outer perimeter"), with the first retainer wall further including a first retainer wall second side having a first retainer wall second side (inner) perimeter (referred to equivalently herein as a "first retainer first wall second side inner perimeter"), with the first retainer second side perimeter defining a first retainer through opening, and with the first retainer further comprising a first retainer flange that can be integral with the first retainer, with the first retainer flange configured to contact the aircraft compartment floor first side, and with the first retainer flange further dimensioned to retain the first retainer within the aircraft cabin floor through opening. The moisture dam assembly further includes a second retainer, with the second retainer including a second retainer wall, with the second retainer wall including a second retainer wall first side having a second retainer wall first side perimeter, with the second retainer wall further including a second retainer wall second side having a second retainer wall second side perimeter, with the second retainer wall configured to mate with said first retainer wall. The moisture dam assembly further includes a flexible sleeve that can be a tubular flexible sleeve, with the flexible sleeve including a flexible sleeve first side and a flexible sleeve second side, and with the flexible sleeve further comprising a flexible sleeve first end having a flexible sleeve first end perimeter at a flexible sleeve first end opening, and with the flexible sleeve further including a flexible sleeve second end having a flexible sleeve second end perimeter at a flexible sleeve second end opening. The flexible sleeve first end perimeter is fixedly, and can further be removably, interposed between said first retainer wall and said second retainer wall. The moisture dam assembly further includes a flexible sleeve retainer strap configured to engage the flexible sleeve second end, with the flexible sleeve retainer strap further configured to alter (e.g., reduce) a dimension of the flexible sleeve second end perimeter from an initial perimeter dimension.

In another aspect, the flexible sleeve first end perimeter is fixedly interposed between the first retainer wall first side (referred to equivalently herein as the "first retainer wall exterior") and the second retainer wall second side (referred to equivalently herein as the "second retainer wall interior").

In another aspect, the flexible sleeve first end perimeter is fixedly interposed between the first retainer wall second side (referred to equivalently herein as the "first retainer wall interior") and the second retainer wall first side (referred to equivalently herein as the "second retainer wall exterior").

In another aspect, the flexible sleeve first end is fixedly and removably interposed between the first retainer wall and the second retainer wall.

In a further aspect, the flexible sleeve further comprises a flexible sleeve selected length, said flexible sleeve selected length extending from the flexible sleeve first end to the flexible sleeve second end.

In another aspect, the second retainer is configured to mate with said first retainer, said flexible sleeve first end configured to be fixedly and removably retained in a frictional fit between said first retainer and said second retainer.

In another aspect, the flexible sleeve retainer strap further comprises a first connector, with the first connector configured to removably engage a second connector, and with the second connector fixedly attached to an aircraft cabin monument structure.

In another aspect, the flexible sleeve comprises a tubular configuration.

In a further aspect, the tubular configuration of the flexible sleeve comprises a frustoconical configuration.

According to a Further Aspect, an Aircraft Comprises the Aircraft Cabin Assembly with the Moisture Dam Assembly of the Type Set Forth Herein.

Further present aspects are directed to an apparatus including a moisture dam assembly, with the moisture dam assembly configured to fixedly and removably attached to an aircraft cabin floor, with the moisture dam assembly including a first retainer, with the first retainer including a first retainer wall, with the first retainer wall including a first retainer wall first side having a first retainer wall first side perimeter (referred to equivalently herein as a "first retainer wall first side outer perimeter"), and a first retainer wall second side having a first retainer wall second side (inner) perimeter (referred to equivalently herein as a "first retainer first wall second side inner perimeter"), with the first retainer second side perimeter defining a first retainer through opening, and with the first retainer further comprising a first retainer flange that can be integral with the first retainer, with the first retainer flange configured to contact the aircraft compartment floor first side, and with the first retainer flange further dimensioned to retain the first retainer within the aircraft cabin floor through opening. The moisture dam assembly further includes a second retainer, with the second retainer including a second retainer wall, with the second retainer wall including a second retainer wall first side having a second retainer wall first side perimeter, and a second retainer wall second side having a second retainer wall second side perimeter, with the second retainer wall configured to mate with said first retainer wall. The moisture dam assembly further includes a flexible sleeve that can be a tubular flexible sleeve, with the flexible sleeve including a flexible sleeve first side and a flexible sleeve second side, and with the flexible sleeve further comprising a flexible sleeve first end having a flexible sleeve first end perimeter at a flexible sleeve first end opening, and with the flexible sleeve further including a flexible sleeve second end having a flexible sleeve second end perimeter at a flexible sleeve second end opening. The flexible sleeve first end perimeter is fixedly and can further be removably interposed between the first retainer wall and the second retainer wall. The moisture dam assembly further includes a flexible sleeve retainer strap configured to engage the flexible sleeve second end, with the flexible sleeve retainer strap further configured to alter (e.g., reduce) a dimension of the flexible sleeve second end perimeter from an initial perimeter dimension.

In another aspect, the second retainer is configured to mate with the first retainer, with flexible sleeve first end configured to be fixedly and removably retained in a frictional fit between the first retainer and the second retainer.

In another aspect, the flexible sleeve retainer strap further includes a first connector, with the first connector configured to removably engage a second connector, with the second connector fixedly attached to an aircraft cabin monument structure.

Further present aspects are directed to a method for preventing moisture from passing through an aircraft floor opening, with the method including installing a moisture dam assembly into an aircraft cabin floor that can be an aircraft cabin monument floor, with the aircraft cabin floor including an aircraft cabin floor opening, and with the moisture dam assembly including a first retainer including a first retainer wall, with the first retainer wall including a first retainer wall first side having a first retainer wall first side perimeter (referred to equivalently herein as a "first retainer wall first side outer perimeter"), and a first retainer wall second side having a first retainer wall second side (inner) perimeter (referred to equivalently herein as a "first retainer first wall second side inner perimeter"), with the first retainer wall second side defining a first retainer through opening, and with the first retainer further comprising a first retainer flange that can be integral with the first retainer, with the first retainer flange configured to contact the aircraft compartment floor first side, and with the first retainer flange further dimensioned to retain the first retainer within the aircraft cabin floor through opening. The moisture dam assembly further includes a second retainer, with the second retainer including a second retainer wall, with the second retainer wall including a second retainer wall first side having a second retainer wall first side perimeter, and a second retainer wall second side having a second retainer wall second side perimeter, with the second retainer wall configured to mate with said first retainer wall. The moisture dam assembly further includes a flexible sleeve that can be a tubular flexible sleeve, with the flexible sleeve including a flexible sleeve first side and a flexible sleeve second side, and with the flexible sleeve further comprising a flexible sleeve first end having a flexible sleeve first end perimeter at a flexible sleeve first end opening, and with the flexible sleeve further including a flexible sleeve second end having a flexible sleeve second end perimeter at a flexible sleeve second end opening. The flexible sleeve first end perimeter is fixedly, and can further be removably, interposed between said first retainer wall and said second retainer wall. The moisture dam assembly further includes a flexible sleeve retainer strap configured to engage the flexible sleeve second end, with the flexible sleeve retainer strap further configured to alter (e.g., reduce) a dimension of the flexible sleeve second end perimeter from an initial perimeter dimension.

In another aspect, the method further includes preventing a moisture flow from passing through an aircraft cabin floor opening.

In another aspect, the method further include sealing the aircraft cabin floor opening by fixedly and removably attaching the flexible sleeve first end of the moisture dam assembly at a flexible sleeve first end/first retainer/second retainer interface at an aircraft cabin floor opening perimeter of the aircraft cabin floor through opening.

In another aspect, the flexible sleeve first end perimeter is fixedly interposed between the first retainer wall first side (referred to equivalently herein as the "first retainer wall exterior") and the second retainer wall second side (referred to equivalently herein as the "second retainer wall interior").

In another aspect, the flexible sleeve first end perimeter is fixedly interposed between the first retainer wall second side (referred to equivalently herein as the "first retainer wall interior") and the second retainer wall first side (referred to equivalently herein as the "second retainer wall exterior").

In a further aspect, the flexible sleeve first end is fixedly and removably interposed between the first retainer wall and the second retainer wall.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
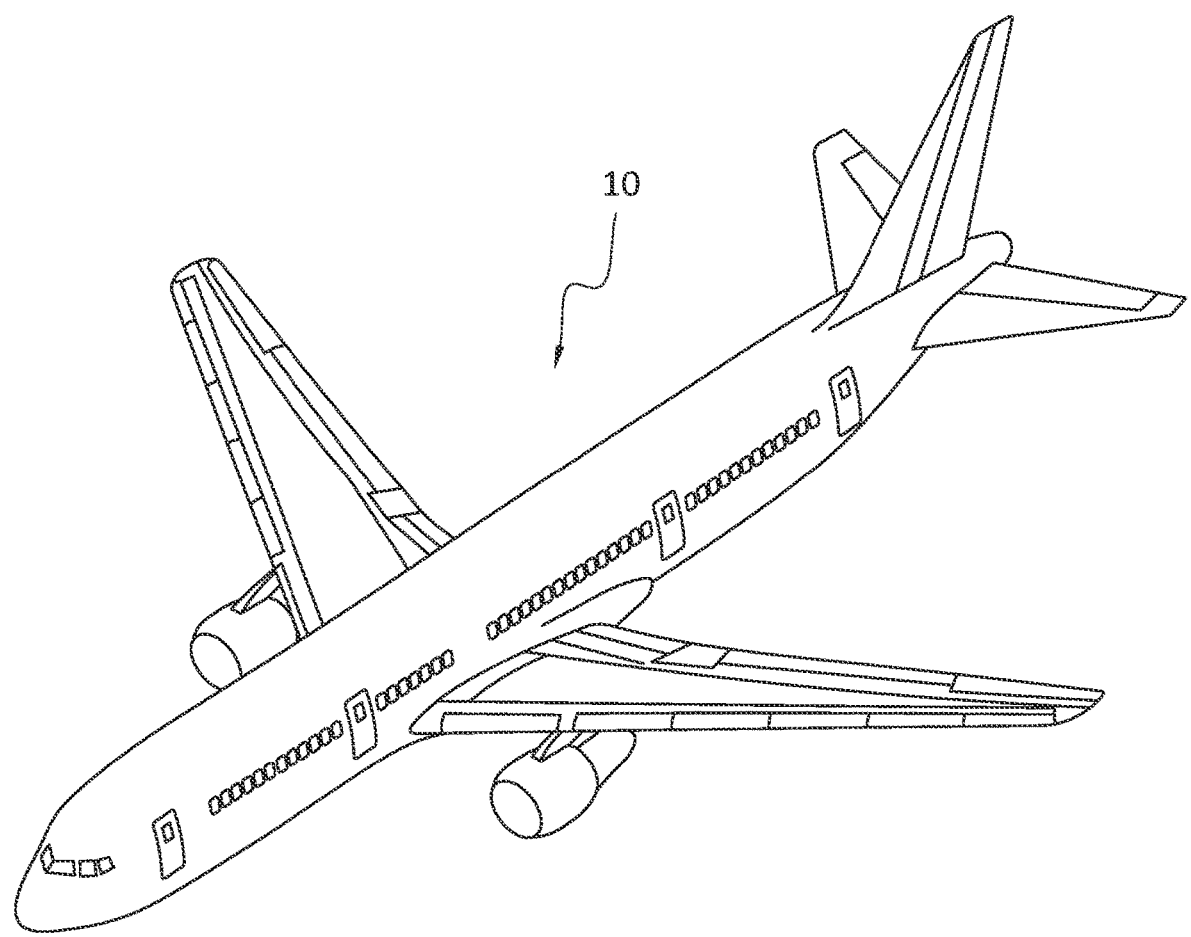
Figure 2:
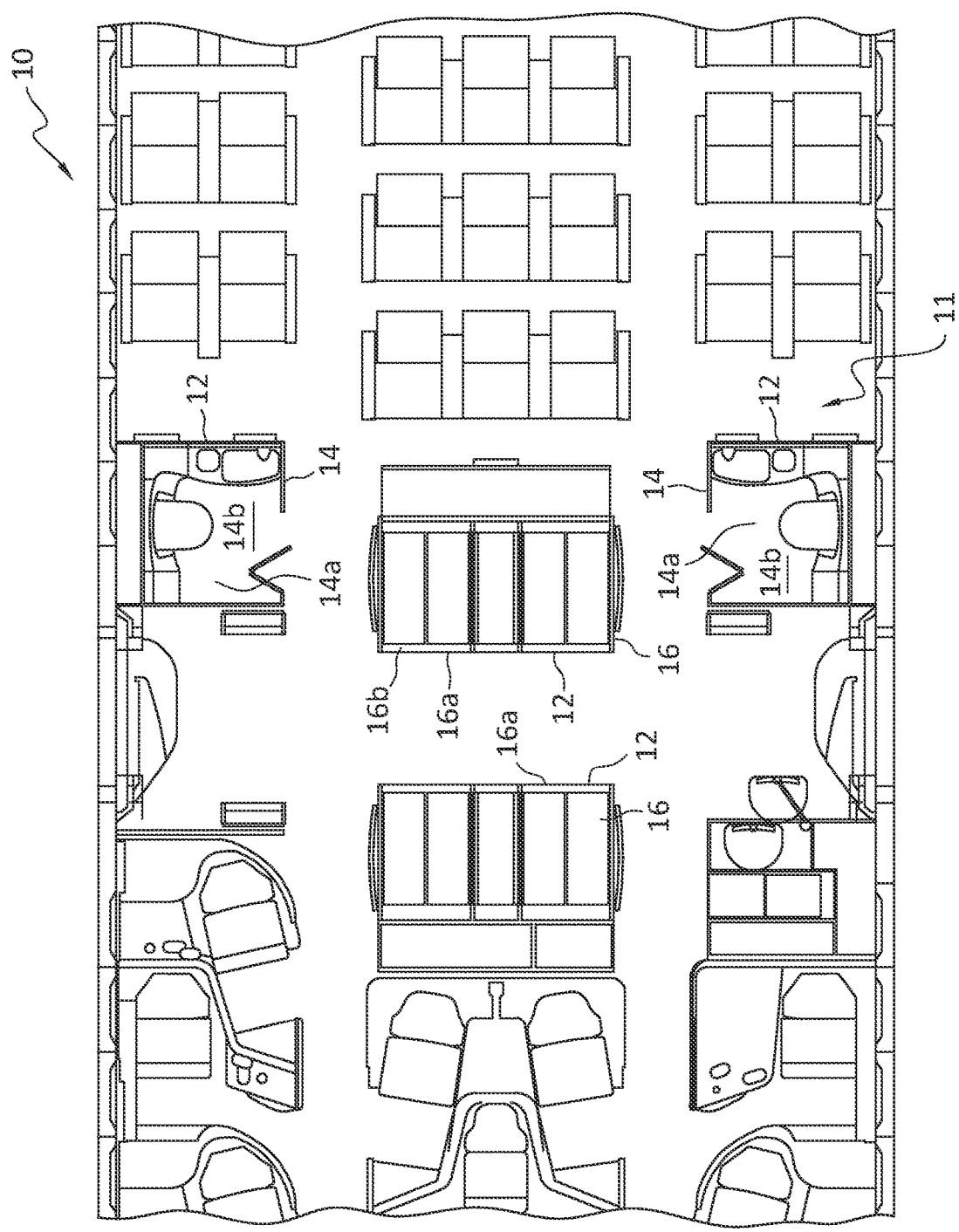
Figure 3:
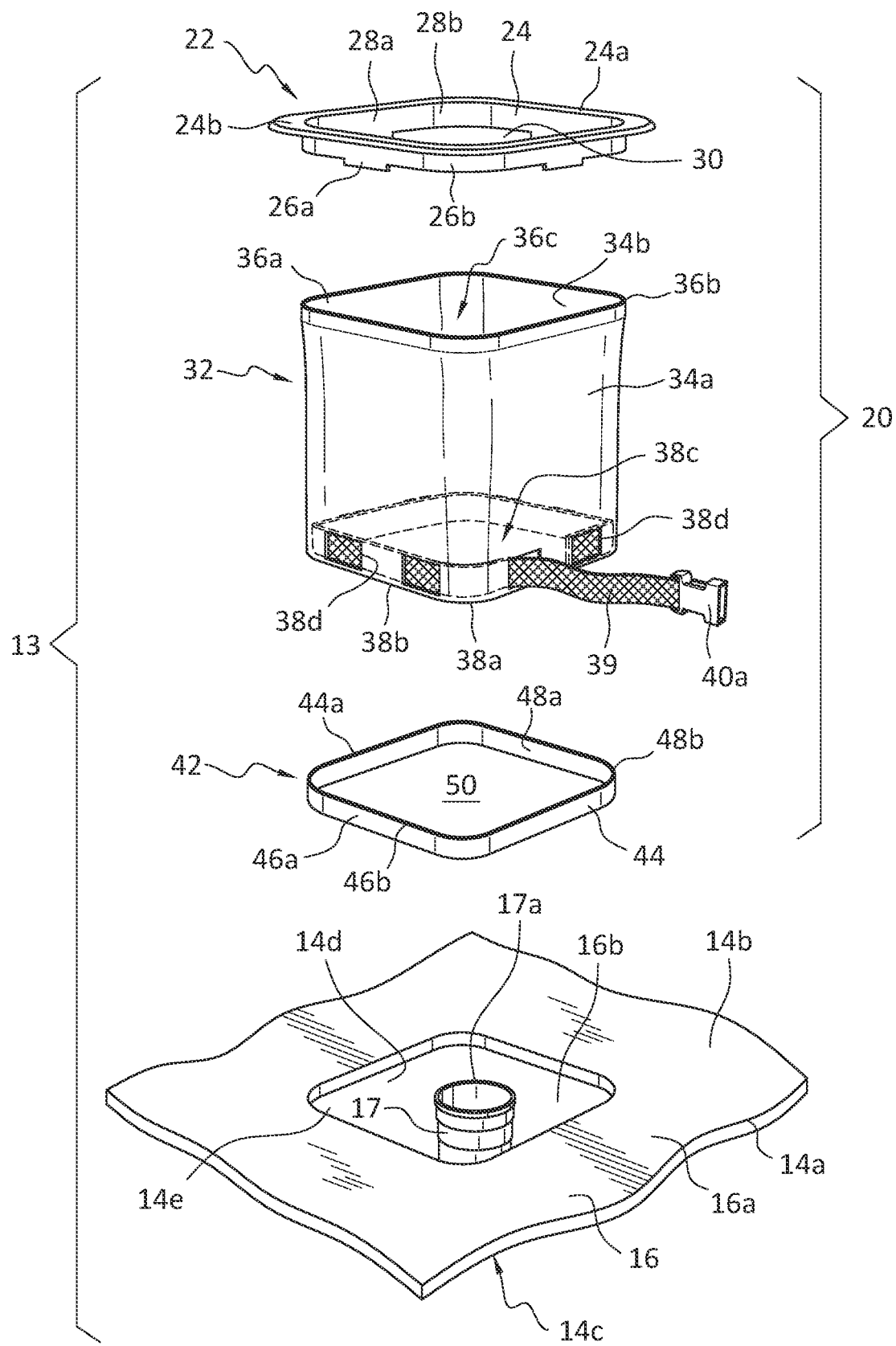
Figure 6A:
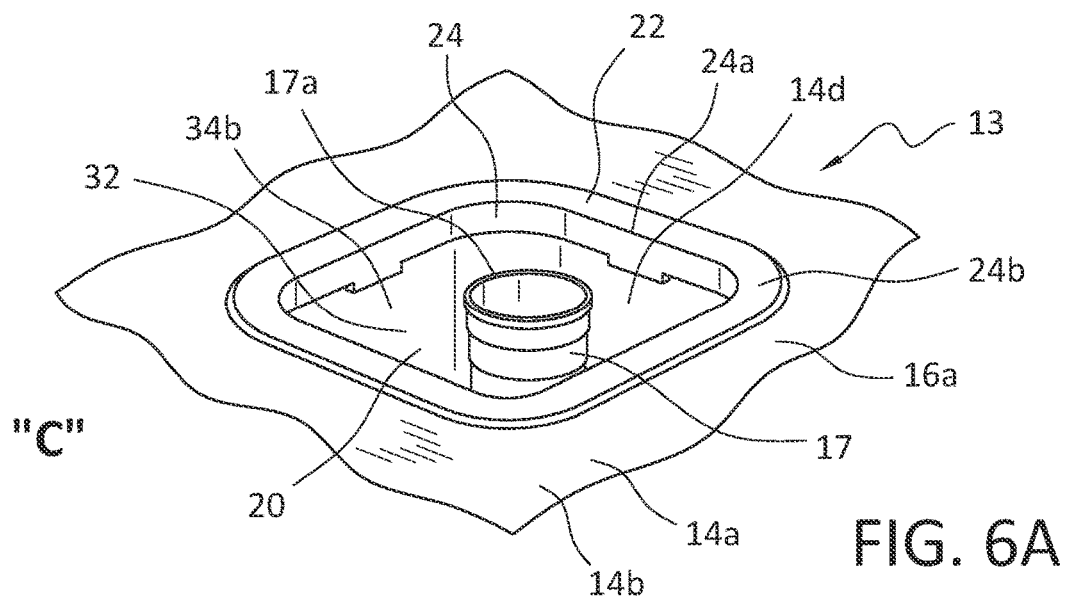
Figure 6B:
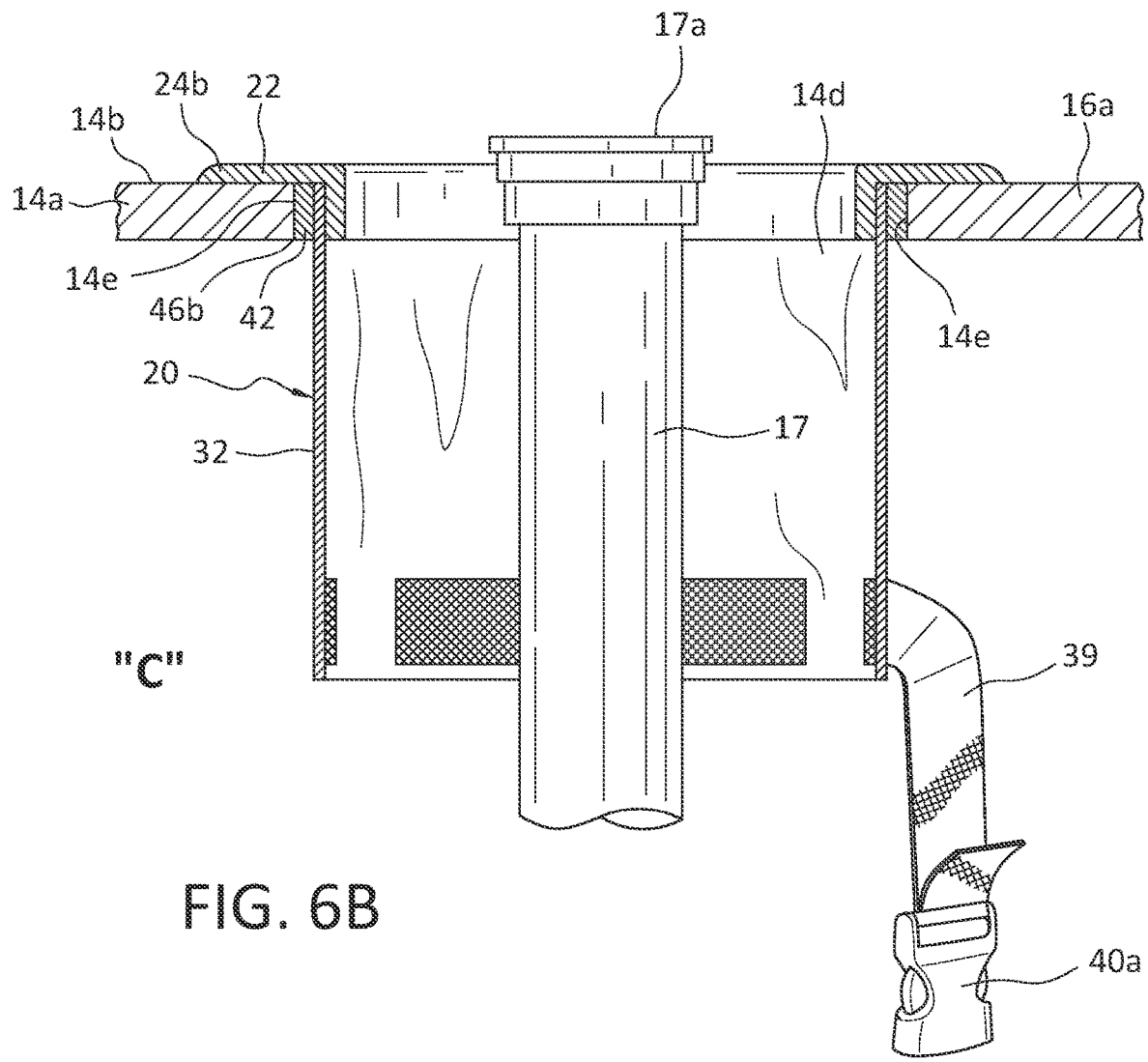
Figure 6C:
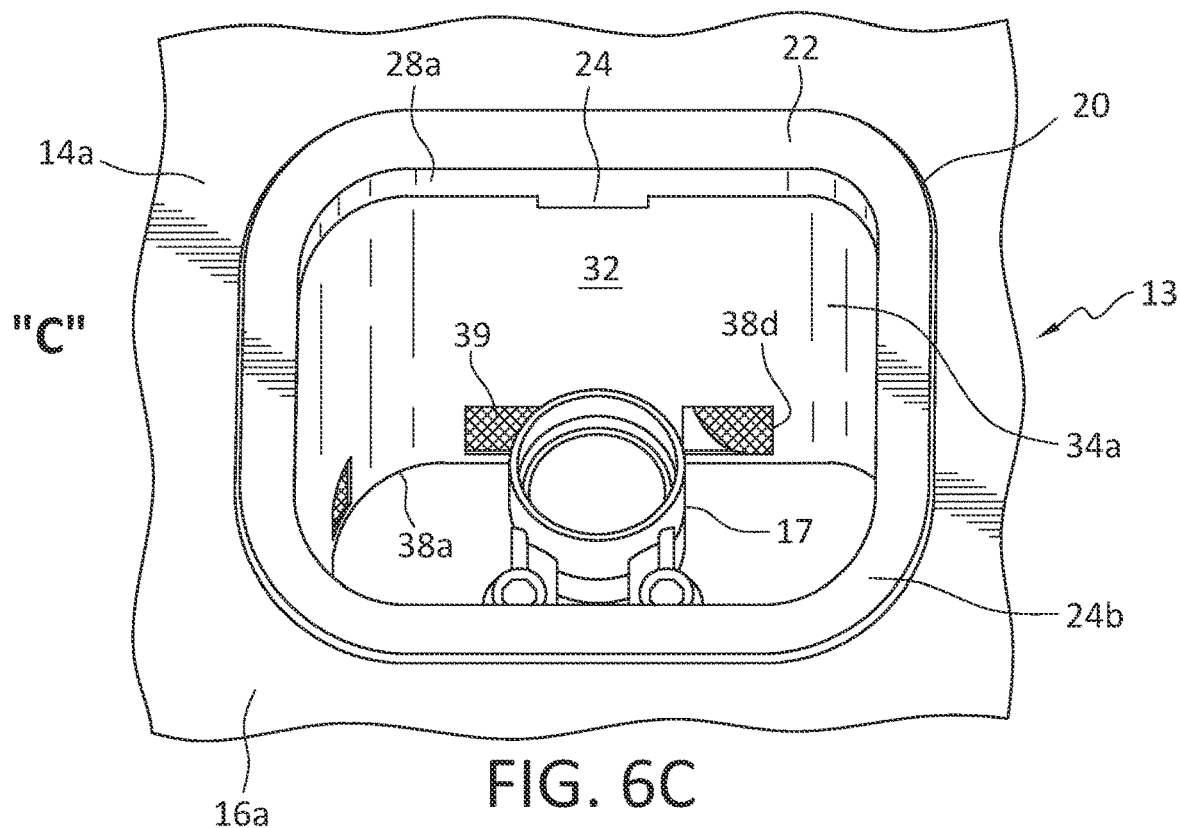
Figure 7:
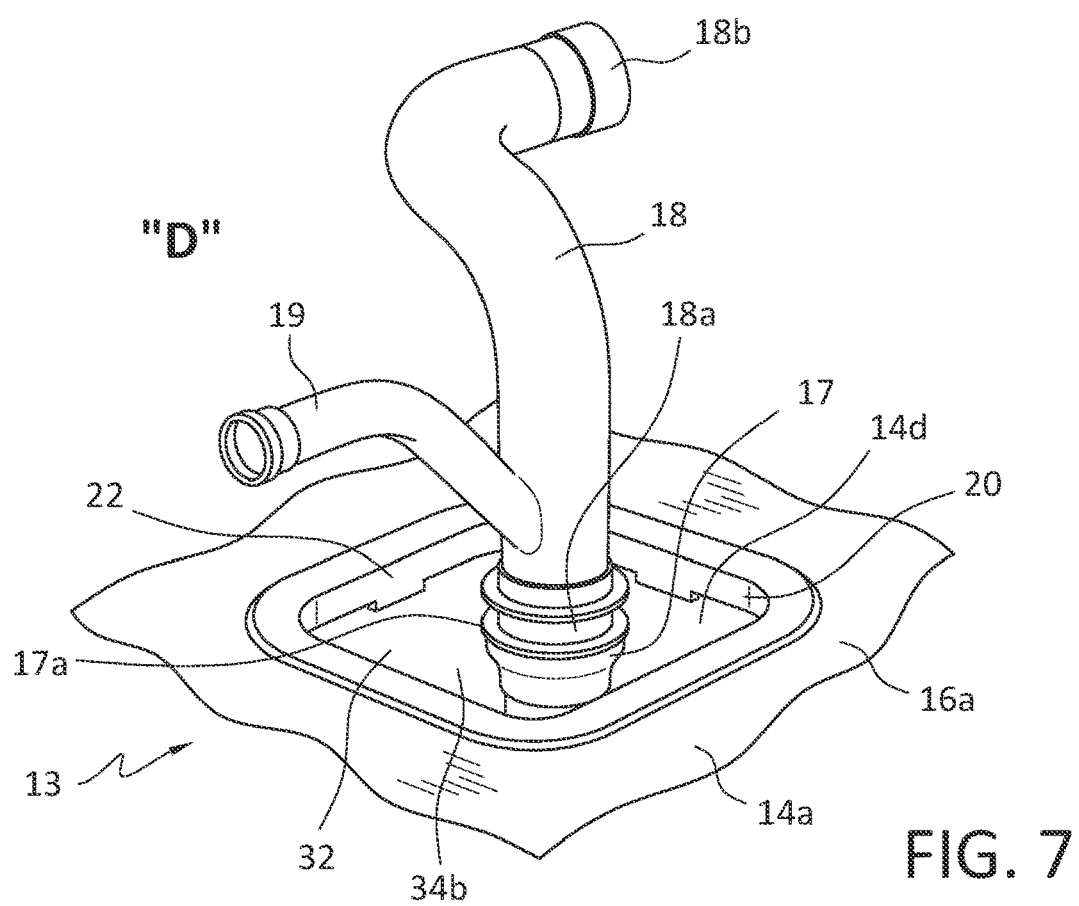
Figure 8A:
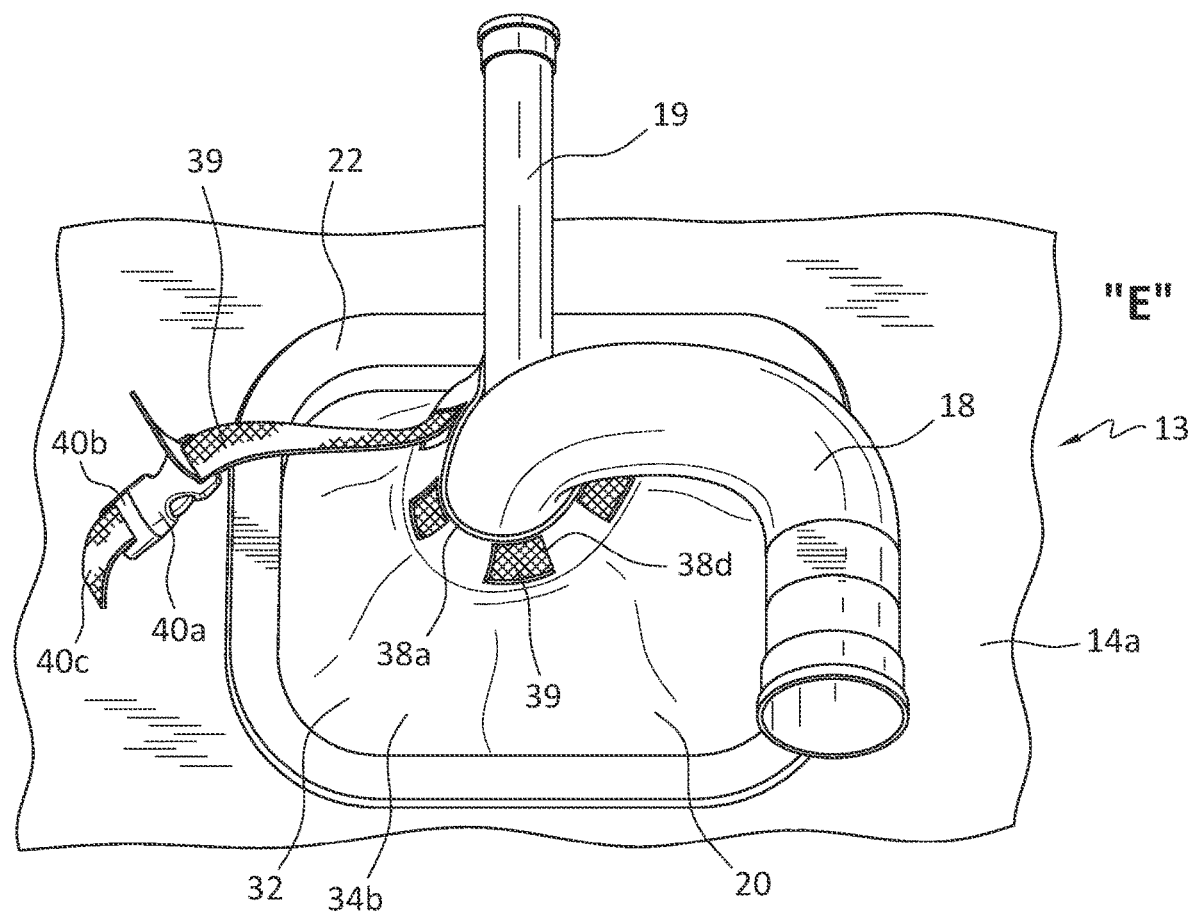
Figure 8B:
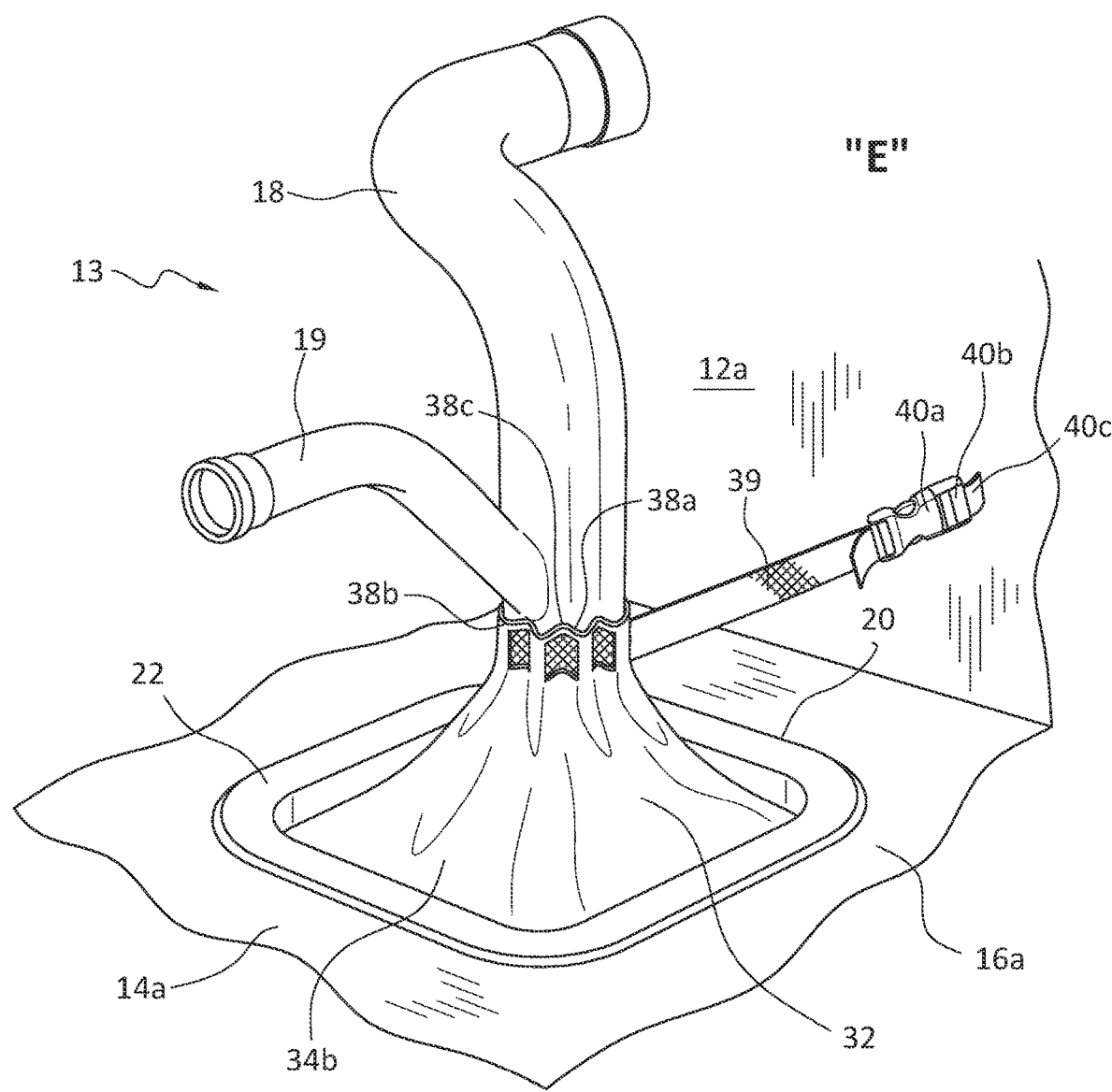
Figure 8C:
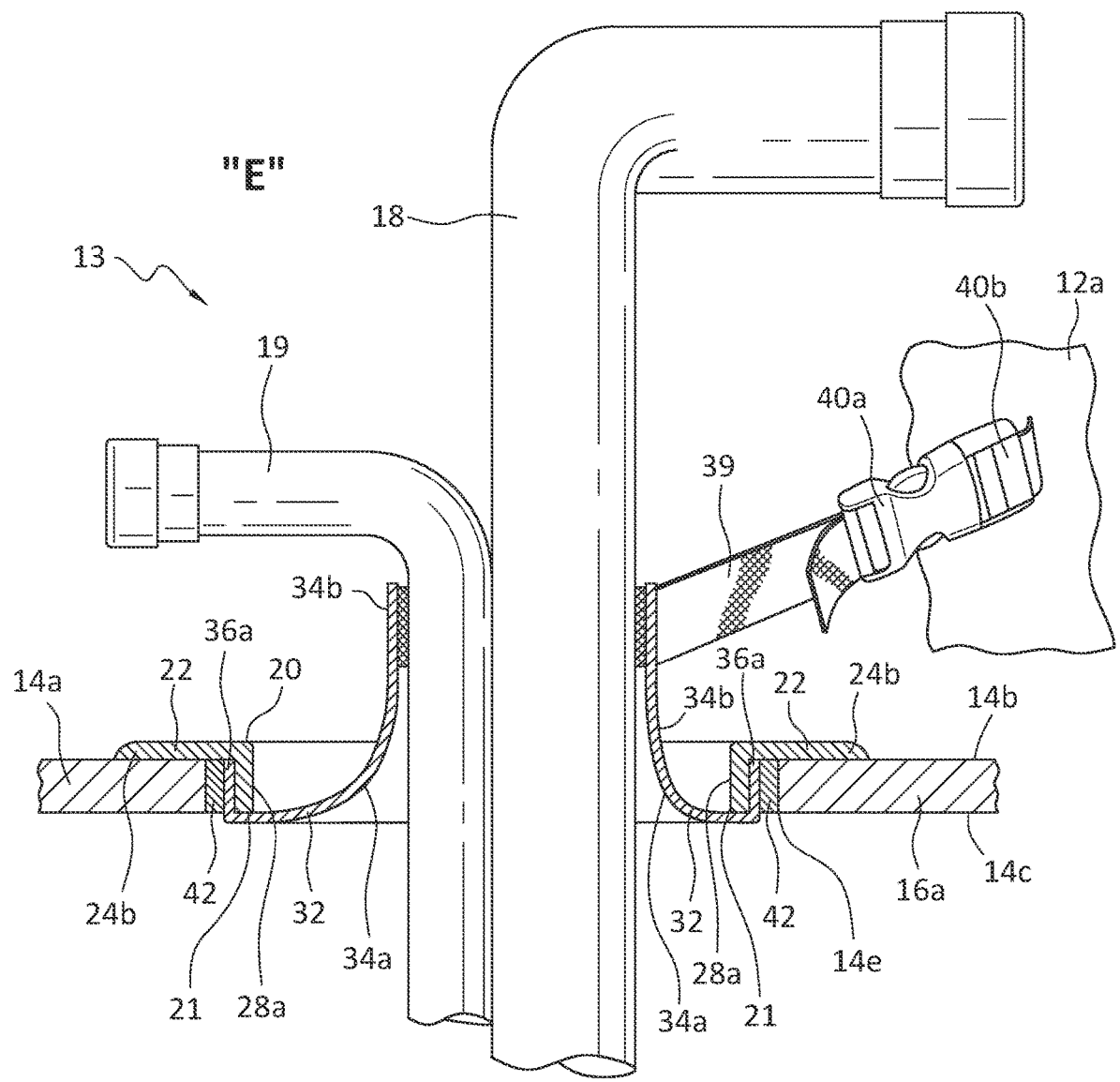
Figure 9:
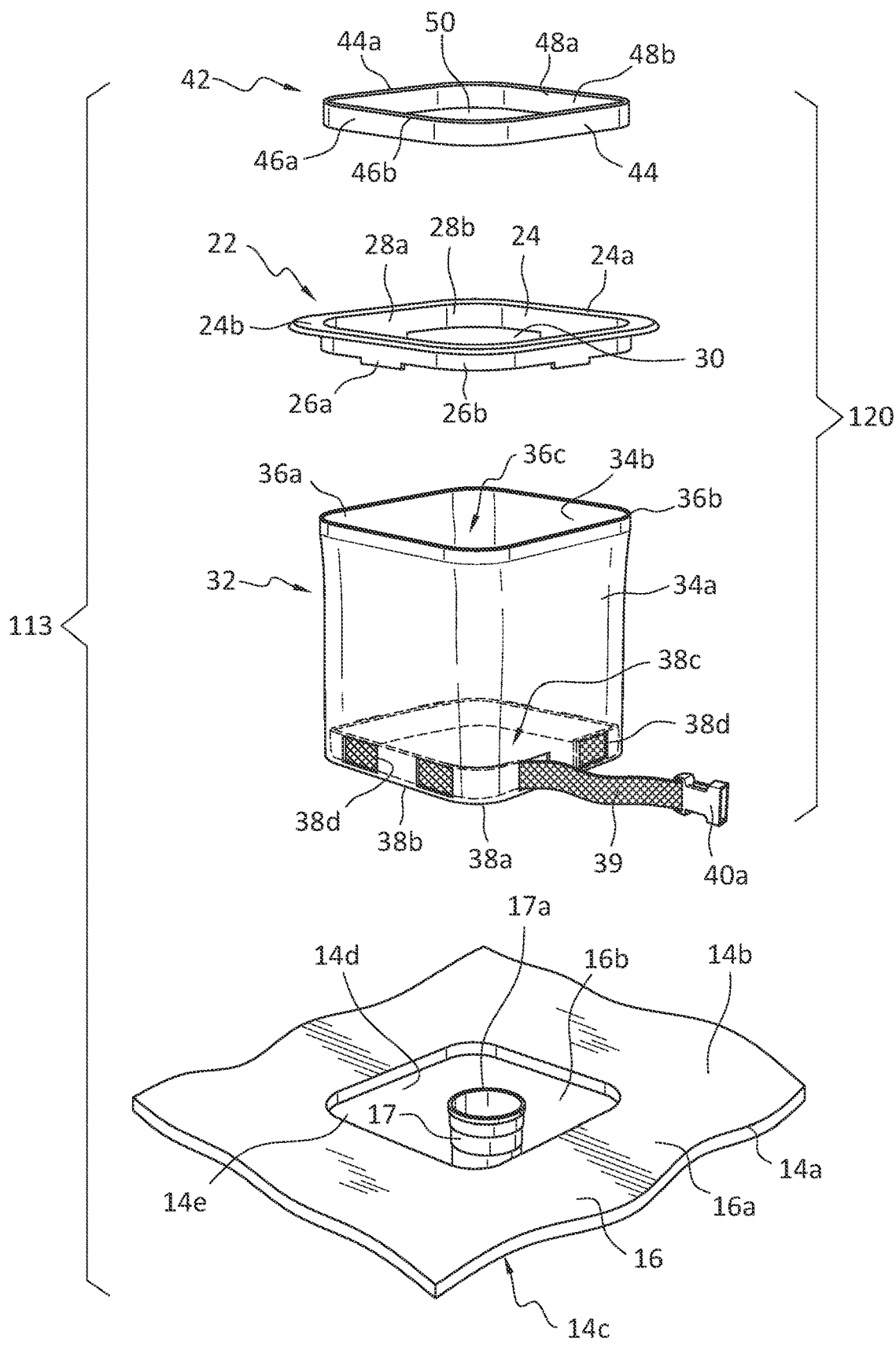
Figure 10:
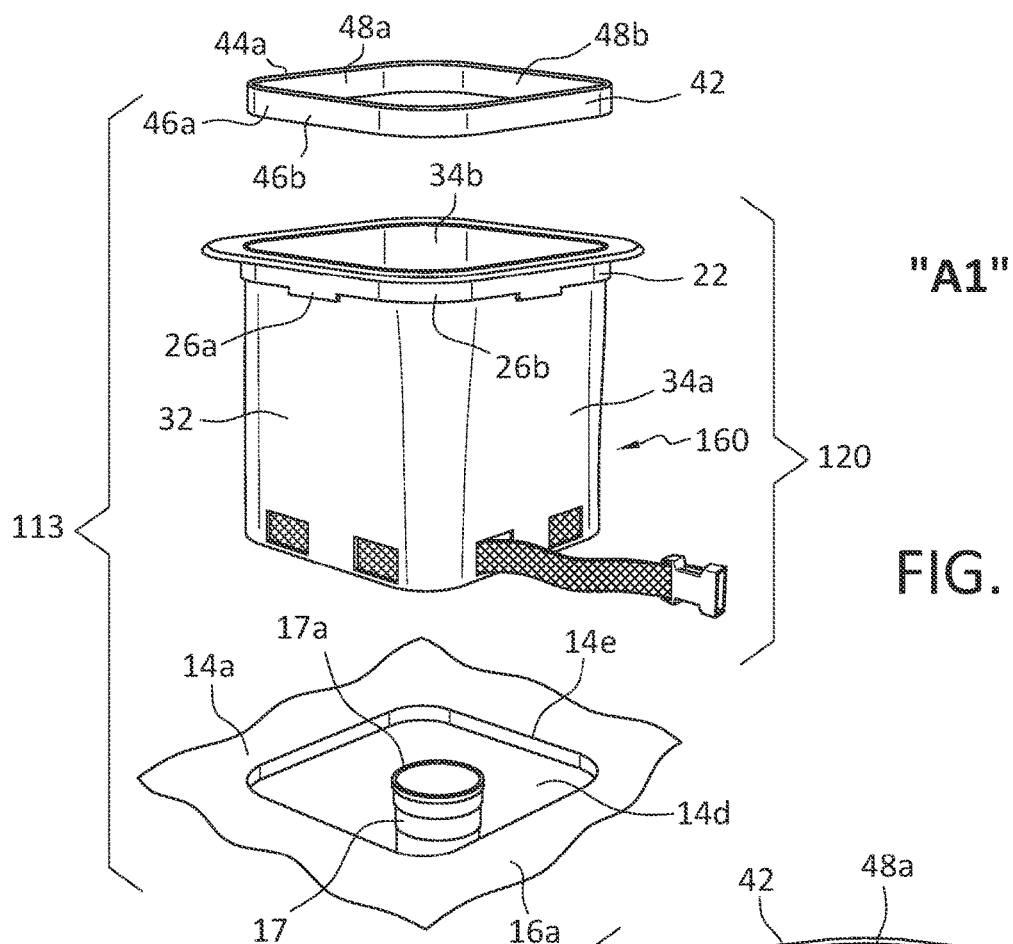
Figure 11:
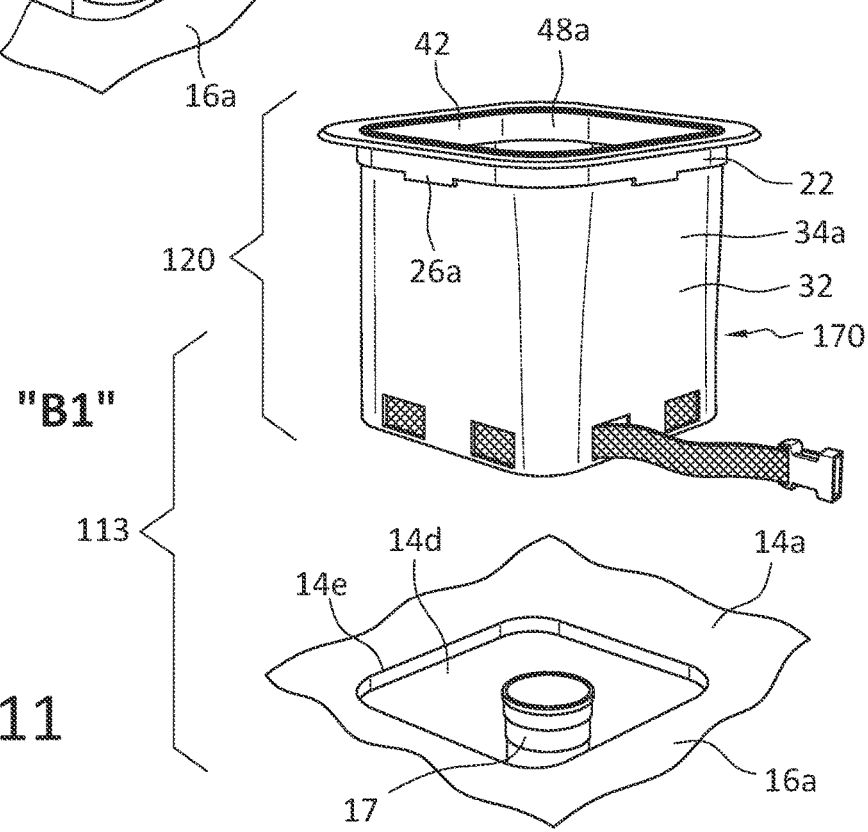
Figure 12A:
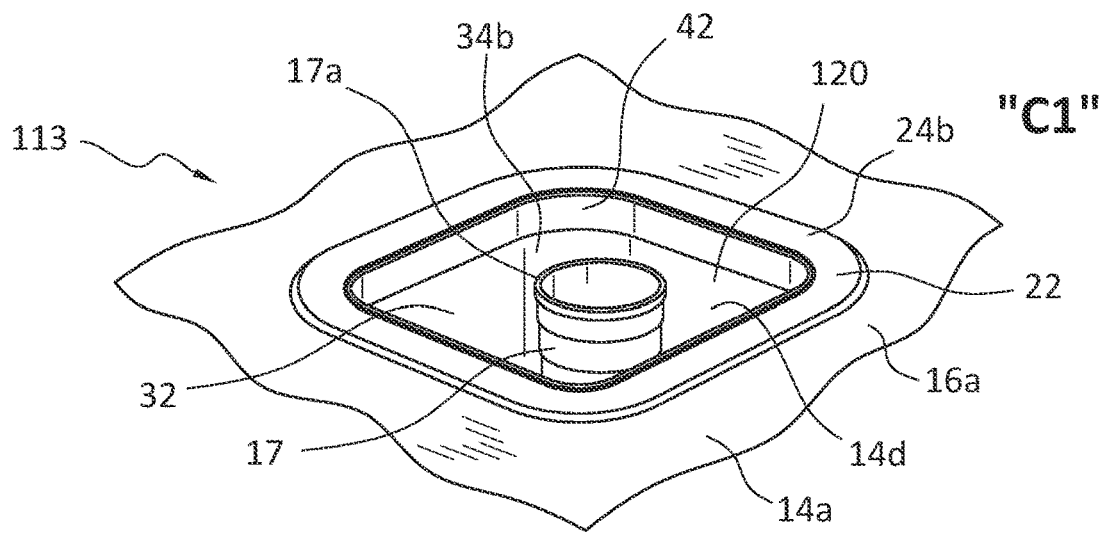
Figure 12B:
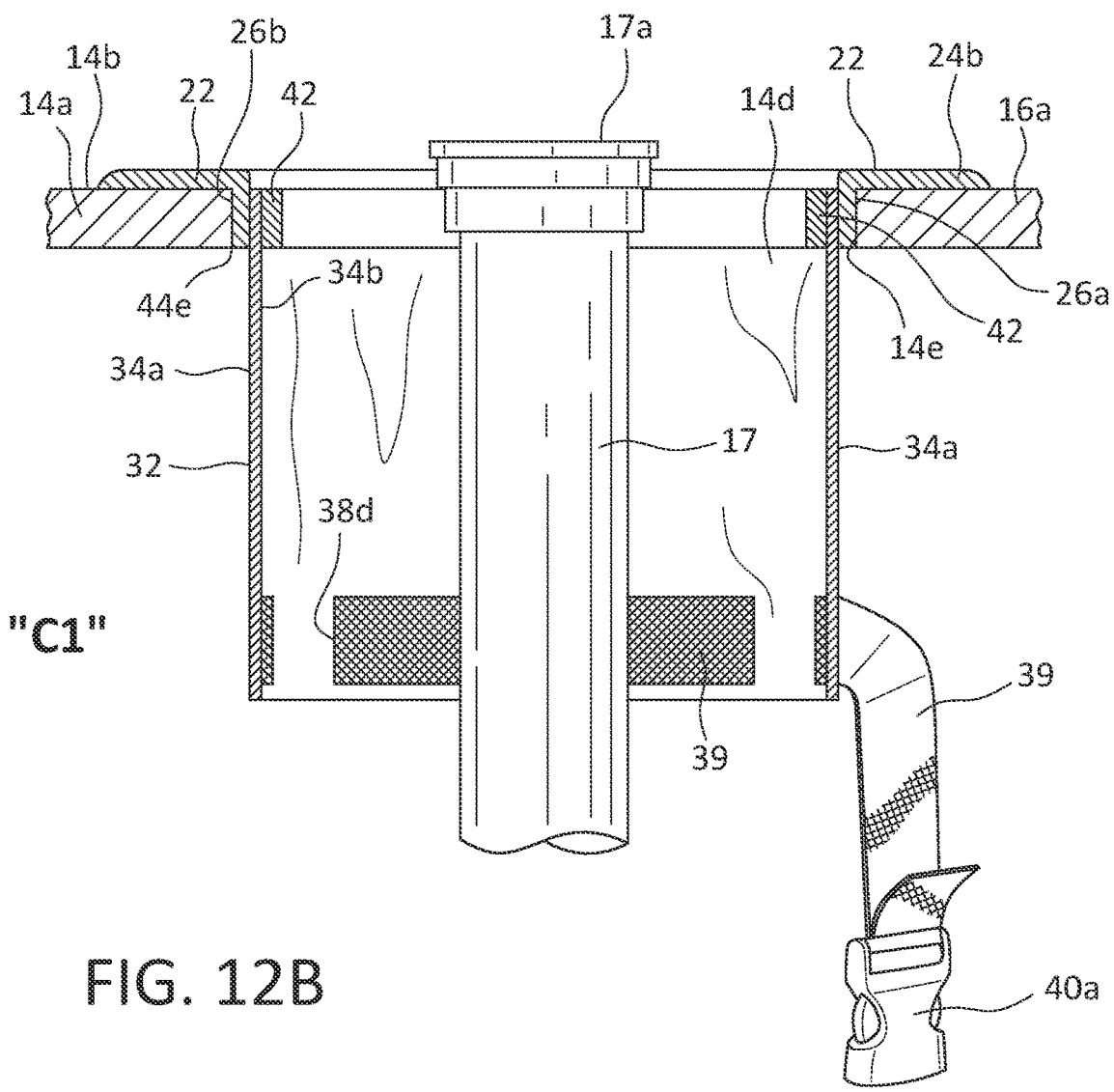
Figure 13:
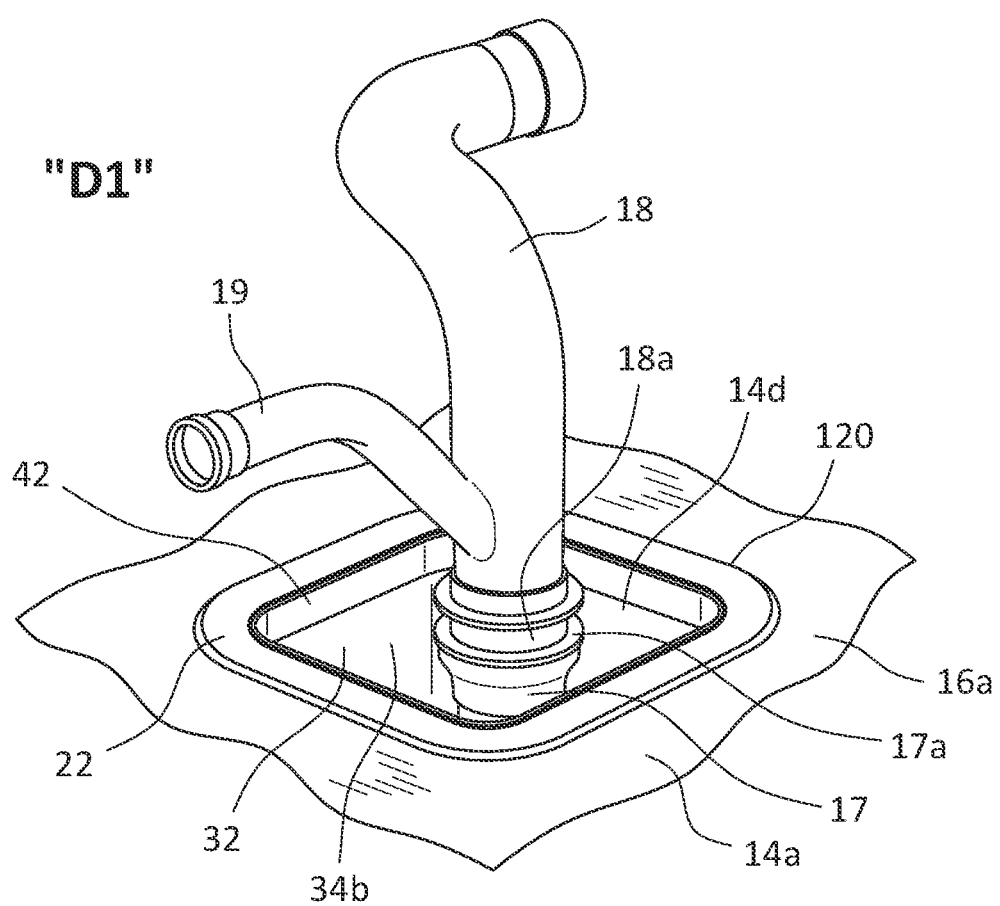
Figure 14A:
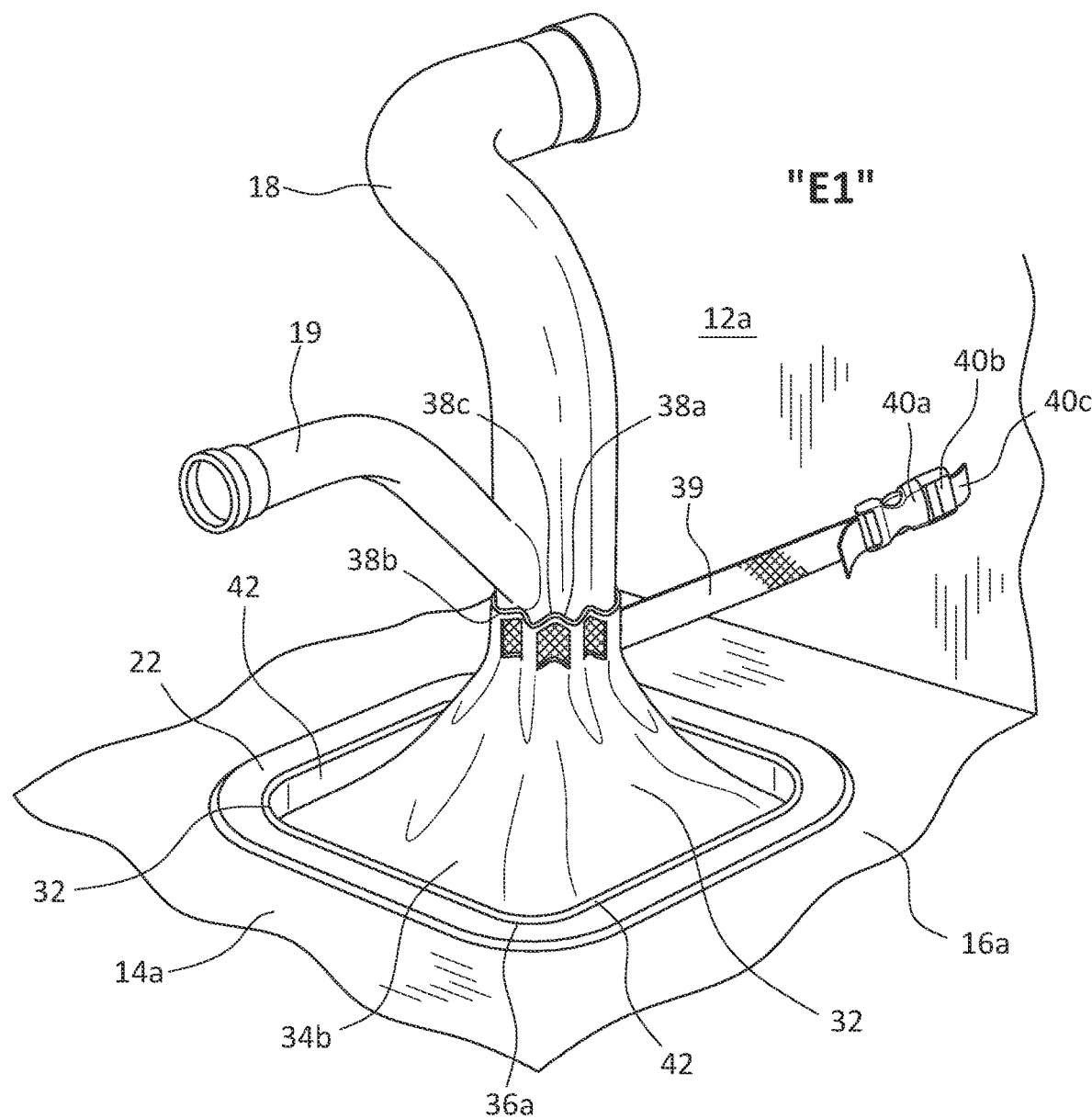
Figure 14B:
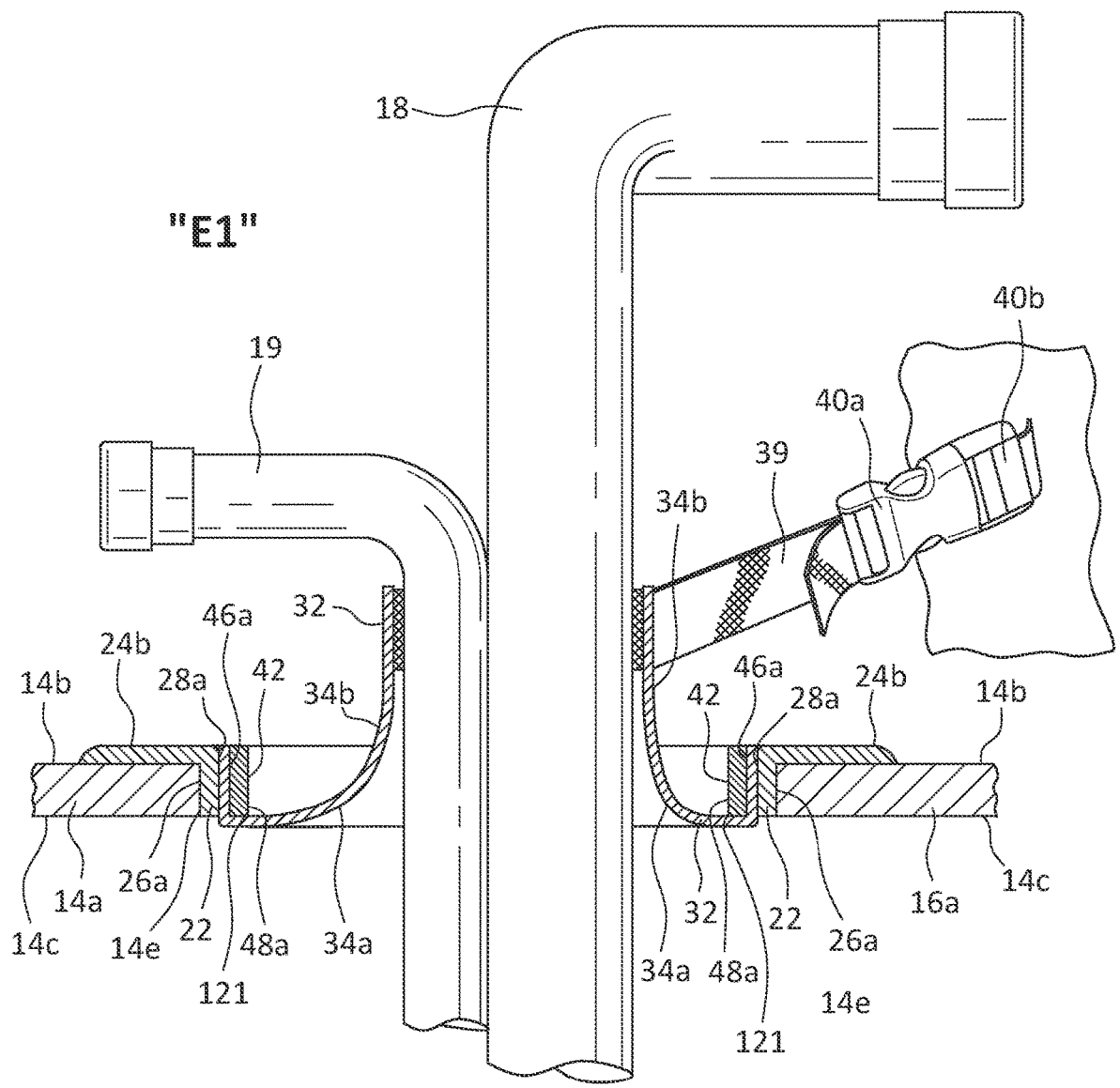
Figure 15:
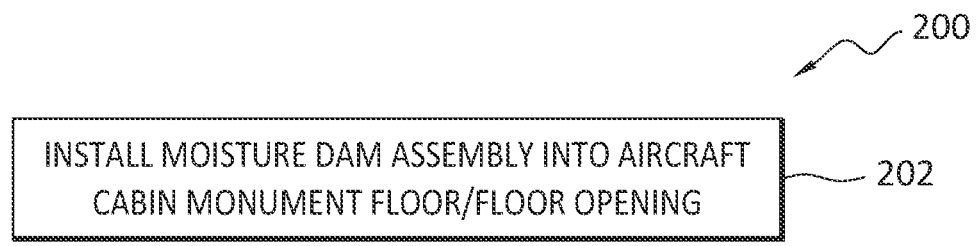
Figure 16:
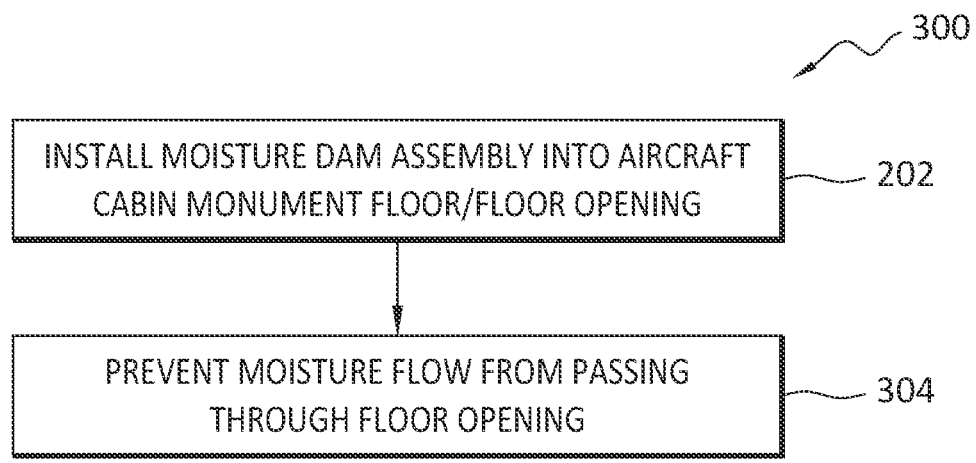

Having thus described variations of the disclosure in general terms, reference will now be made to the accompanying drawings, which are not necessarily drawn to scale, and wherein:

FIG. 1 is an illustration of an aircraft, according to present aspects;

FIG. 2 is an overhead plan view into an aircraft interior and showing aircraft cabin assemblies, according to present aspects;

FIG. 3 is an exploded view of a section of an aircraft cabin assembly comprising a moisture dam assembly, according to present aspects;

FIG. 4 is an exploded view of a section of an aircraft cabin assembly comprising a moisture dam assembly in a first stage "A" of an exemplary assembly progression, according to present aspects;

FIG. 5 is an exploded view of a section of an aircraft cabin assembly comprising a moisture dam assembly in a stage "B" of an exemplary assembly progression, according to present aspects;

FIG. 6A is an illustration of a moisture dam assembly installed into a floor through opening of an aircraft cabin floor in a stage "C" of an exemplary assembly progression, according to present aspects;

FIG. 6B is a cross-sectional view of the installed moisture dam assembly of the type shown in FIG. 6A and in a stage "C" of an exemplary assembly progression, according to present aspects;

FIG. 6C shows an enlarged view of the installed moisture dam assembly of the type shown in FIGS. 6A, 6B and in a stage "C" of an exemplary assembly progression, according to present aspects;

FIG. 7 is a further illustration of an aircraft cabin assembly comprising the moisture dam assembly in a stage "D" of an exemplary assembly progression, according to present aspects;

FIG. 8A is an illustration of a moisture dam assembly installed into a floor through opening of an aircraft cabin floor, in an aircraft cabin assembly of the type shown at least in FIG. 6C, in a stage "E" of an exemplary assembly progression, with the flexible sleeve brought into position a distance above the floor and configured to surround plumbing in an aircraft cabin assembly, according to present aspects;

FIG. 8B is a further perspective view of the aircraft cabin assembly comprising the moisture dam assembly of the type shown in FIG. 8A, in a stage "E" of an exemplary assembly progression, according to present aspects;

FIG. 8C is a partial cross-sectional view of a section of an aircraft cabin assembly comprising the moisture dam assembly of the type shown at least in FIGS. 8A, 8B, in a stage "E" of an exemplary assembly progression, according to present aspects;

FIG. 9 is an exploded view of a section of an aircraft cabin assembly comprising a moisture dam assembly, according to present aspects;

FIG. 10 is an exploded view of a section of an aircraft cabin assembly comprising a moisture dam assembly in a first stage "A1" of an exemplary assembly progression, according to present aspects;

FIG. 11 is an exploded view of a section of an aircraft cabin assembly comprising a moisture dam assembly in a stage "B1" of an exemplary assembly progression, according to present aspects;

FIG. 12A is an illustration of a moisture dam assembly installed into a floor through opening of an aircraft cabin floor in a stage "C1" of an exemplary assembly progression, according to present aspects;

FIG. 12B is a cross-sectional view of the installed moisture dam assembly of the type shown in FIG. 12A and in a stage "C1" of an exemplary assembly progression, according to present aspects;

FIG. 13 is a further illustration of an aircraft cabin assembly comprising the moisture dam assembly in a stage "D1" of an exemplary assembly progression, according to present aspects;

FIG. 14A is a perspective view of the aircraft cabin assembly comprising the moisture dam assembly in a stage "E1" of an exemplary assembly progression, according to present aspects;

FIG. 14B is a partial cross-sectional view of a section of an aircraft cabin assembly comprising the moisture dam assembly of the type shown in FIG. 14A and in a stage "E1" of an exemplary assembly progression, according to present aspects;

FIG. 15 is a flowchart outlining a method, according to present aspects;

FIG. 16 is a flowchart outlining a method, according to present aspects; and

Figure 17:
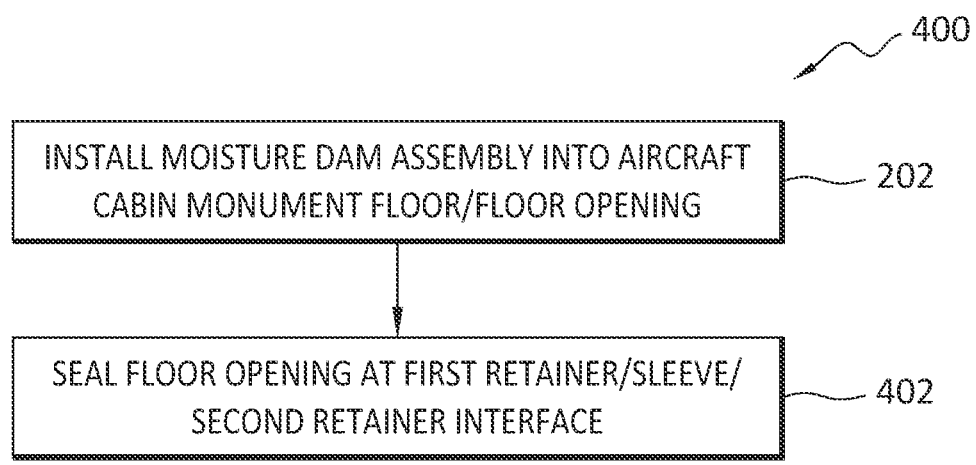

FIG. 17 is a flowchart outlining a method, according to present aspects.

DETAILED DESCRIPTION

Present aspects are directed to apparatuses, systems, and methods for impeding and otherwise preventing the flow of liquids and/or moisture from proceeding through a floor section of an aircraft cabin assembly of the type that can be located within an aircraft cabin of an aircraft. More particularly, present aspects are directed to retaining an amount of liquid and or moisture originating within a first aircraft cabin assembly that is within a first aircraft cabin monument from migrating from the floor of the first aircraft cabin monument into a second aircraft region located, beyond the first aircraft cabin monument (e.g., located beneath or below the aircraft cabin monument, etc.).

Present aspects employ incorporating a protective moisture dam assembly (referred to equivalently herein as a "moisture dam assembly") into an aircraft cabin assembly for the purpose of blocking, redirecting, and/or controlling, and altering the directional flow of a liquid and/or moisture (e.g., into an aircraft region where liquid and/or moisture accumulation is not wanted) from an aircraft cabin assembly located within an aircraft cabin monument (that can be, for example, an aircraft cabin lavatory, an aircraft cabin galley, etc.) such as, for example, through a floor section that can be, for example, a floor through opening, etc.) of an aircraft cabin monument.

FIG. 1 shows a perspective view of an aircraft 10 of the type comprising the presently disclosed systems, apparatuses, and methods. FIG. 2 is an overhead plan view, and exposed view of the aircraft 10 of the type shown in FIG. 1, showing an aircraft cabin 11 with a plurality of aircraft cabin monuments 12 positioned throughout the aircraft cabin 11. Aircraft cabin monuments 12 can be in the form of, but not limited to, an aircraft cabin lavatory 14 and an aircraft cabin galley 16.

As further shown in FIG. 2, aircraft monument lavatory 14 can have an aircraft cabin lavatory floor 14a that comprises an aircraft cabin lavatory floor first side 14b (e.g., a lavatory floor upper surface) that comprises a surface that is exposed and visible to, for example, an occupant of the aircraft cabin lavatory 14. Aircraft cabin galley 16 comprises an aircraft cabin galley floor 16a that further comprises aircraft cabin galley floor first side 16b (e.g., a galley floor upper surface) that comprises a surface that can be exposed and visible from the aircraft cabin, or that can be covered from view by elements/features of the aircraft cabin galley 16 such as, for example a cabinet, or other elements/features of the galley monument, etc.

Although not shown in FIG. 2, aircraft cabin lavatory floor 14*a* further comprises an aircraft cabin lavatory floor second side 14*c*, and an aircraft cabin lavatory floor through opening 14*d*, and an aircraft cabin lavatory floor through opening perimeter 14*d* that is bounded by the aircraft cabin lavatory floor 14*a*. The aircraft cabin lavatory floor is shown in more detail and in cross-section at least in FIGS. 8C, 12B, 14B. According to present aspects, similar floor features found in the aircraft lavatory floor also can be found with respect to an aircraft cabin galley floor, although not necessarily shown in all FIGs.

According to present aspects, protective moisture dams are presented that inhibit and otherwise significantly restrict and/or substantially completely prevent a flow of moisture (e.g., liquid flow, fluid flow, etc., that can include water, etc.) from an aircraft cabin monument through an aircraft cabin floor opening in the monument into areas of an aircraft located beneath and/or "under" an aircraft cabin floor, especially where a collection of such moisture and/or liquids would not be wanted and that could otherwise require removal of such moisture from such areas of the aircraft positioned beneath an aircraft cabin floor.

The presently disclosed protective moisture dam can comprise a protective moisture dam assembly, as shown, for example, in the FIGs., and as described herein, and such present protective moisture dam assemblies can be integrated and otherwise brought into communication with aircraft cabin monument floor sections, and otherwise integrated into aircraft that comprise aircraft monument assemblies that can include, for example, an aircraft cabin lavatory, an aircraft cabin galley, and other aircraft cabin monuments that house, are in communication with, and/or that otherwise incorporate fluid sources or fluid collection devices (e.g., fluid tanks, fluid waste tanks, etc.). Further present aspects comprise aircraft comprising aircraft cabin assemblies comprising the present protective moisture dams, as well as methods of installing the protective moisture dams into aircraft cabin assemblies, into aircraft cabin monuments, and into aircraft comprising the aircraft cabin monuments.

FIG. 3 shows an exploded view of a present moisture dam assembly 20 that can be installed into an aircraft cabin monument 13, such as an aircraft cabin monument (lavatory, galley, etc.) assembly that is incorporated or otherwise brought into contact with and comprises a section of an aircraft cabin monument floor to form an aircraft cabin assembly 13. As shown in FIG. 3, protective moisture dam assembly (referred to equivalently herein as "moisture dam assembly") comprises a first retainer 22 and second retainer 42 brought into contact with flexible sleeve 32. FIGS. 3, 4, and 5, depict a progression of assembling the protective moisture dam assembly 20, with at least FIG. 6A showing the moisture dam assembly 13 positioned within an aircraft monument floor section that can be an aircraft cabin lavatory floor 14*a* of an aircraft cabin lavatory 14 that can have an aircraft cabin lavatory floor through opening 14*d*, aircraft cabin galley floor 16*a* of an aircraft cabin galley 16 that can have an aircraft cabin galley floor through opening 16*b*, etc.

As shown in FIG. 3, a floor section that can be an aircraft cabin lavatory floor 14*a* comprises an aircraft cabin lavatory first side 14*b* (referred to equivalently herein as an aircraft cabin lavatory "upper" side, "upper floor surface", "exposed floor surface"), and an aircraft cabin lavatory second side 14*c* (referred to equivalently herein as an aircraft cabin lavatory "lower" side, "lower floor surface", "unexposed floor surface"), with the first and second floor sides shown in further detail in FIGS. 8C and 14B. According to present aspects, the floor section shown relates to a section of an aircraft cabin monument assembly floor through which a plumbing line passes to deliver a fluid (e.g., water, etc.) to facilitate the delivery such fluid to an aircraft monument, or to facilitate collect of a fluid (water, wastewater, etc.) from an aircraft monument such as, for example, an aircraft cabin lavatory, galley, etc.).

FIG. 3 shows an exploded view of an aircraft cabin assembly 13 comprising an incomplete plumbing assembly comprising a first pipe 17 predominantly located at or beneath the surface of the aircraft cabin lavatory floor first side 14*b* of lavatory floor 14*a*, with first pipe 17 comprising first pipe first end 17*a* that can be configured to connect to a second pipe of, for example, a plumbing assembly as shown at least in FIGS. 7, 13. As further shown in FIG. 3, aircraft cabin lavatory floor 14*a* further comprises aircraft cabin lavatory floor through opening 14*d* having an aircraft cabin lavatory through opening perimeter 14*e*, with the aircraft cabin lavatory floor through opening 14*d* bounded by the surrounding aircraft cabin lavatory floor 14*a*.

According to present aspects, the protective moisture dam assembly 20, as shown in FIG. 3, comprises first retainer 22 and second retainer 42 that can be a rigid first and second retainers and that can be made from a material able to retain and hold its form such as, for example, a plastic-containing material, a rubber-containing material, a composite material, a silicone-containing material, and a combination thereof. In one example, the first and second retainers can be flexible as well as rigid. The first retainer can comprise a first retainer wall 24 having a first retainer wall perimeter 24*a* and with a first retainer wall flange 24*b* located at, and extending from, the first retainer wall perimeter 24*a*. In one example, first retainer wall flange 24*b* can be integral with the first retainer wall 24.

In one example, the first retainer 22 and second retainer 42 can be made from the same or different materials, and the first retainer and second retainer can be made from a material that will resiliently and repeatedly deform (e.g., deform under a compressive force) and expand (e.g., in the absence of or in the decreasing of the compressive force) to a selected degree and expand or return toward an original dimensional form, or "footprint". According to present aspects, the first retainer can deliver superior sealing characteristics when positioned adjacent to, for example, an aircraft cabin monument floor material at, for example, an aircraft cabin monument floor through opening.

The first retainer can be made from a resilient material having a selected elastic deformation in the presence of a compressible force and a commensurate selected Young's modulus such that the first retainer can repeatedly and reversibly compress in the presence of a compressive force (e.g., a compressive force "inward") and then, in the absence or amelioration of the compressive force, can expand outwardly toward an original retainer configuration and footprint and/or dimension that is close to an original first retainer footprint in the absence of a compressive force.

First retainer wall 24 further comprises a first retainer wall first side 26*a* (shown in FIG. 3 as a "first retainer wall exterior side") having a first retainer wall first side perimeter 26*b*. First retainer wall 24 further comprises first retainer wall second side 28*b* (shown in FIG. 3 as a "retainer wall interior side") having first retainer wall second side perimeter 28b. The distance between the first retainer wall first side perimeter 26b and first retainer wall second side perimeter 28b represents a first retainer wall thickness, "t1". FIG. 3 further shown a first retainer through opening 30 bounded by the first retainer wall second side (e.g., first retainer wall "interior" side), According to further present aspects, FIG. 3 further shows flexible sleeve 32 in a tubular configuration that can maintain or that can be manipulated and otherwise configured into a form along the length of the flexible sleeve that approximates the geometry of first retainer 22. Flexible sleeve 32 also can be made of a thin and robust sheet-like material that does not alone maintain its own form, and at least a portion of which can be manipulated and otherwise configured into a geometric form that approximates the geometric form of the first retainer 22 when the first retainer engages the flexible sleeve 32.

Flexible sleeve 32 comprises a flexible sleeve first side 34a (shown in FIG. 3 as the flexible sleeve "exterior" side), and a flexible sleeve second side 34b (shown in FIG. 3 as the flexible sleeve "interior" side). Flexible sleeve 32 further comprises a flexible sleeve first end 36a (shown in FIG. 3 as a flexible sleeve "upper" end) having a flexible sleeve first end perimeter 36b bounding a flexible sleeve first end opening 36c. Flexible sleeve 32 further comprises a flexible sleeve second end 38a (shown in FIG. 3 as a flexible sleeve "lower" end) having a flexible sleeve second end perimeter 38b bounding a flexible sleeve second end opening 38c. Flexible sleeve second end 38a further comprises at least one flexible sleeve second end slot 38d through which can be fed flexible sleeve retainer strap 39 that, as shown in FIG. 3, is configured to further bound the flexible sleeve second end perimeter 38b. One end of the flexible sleeve retainer strap 39 is shown in fixed communication with a first connecter 40a such that one end of flexible sleeve retainer strap terminates at first connector 40a that can be a discrete part in fixed communication with strap 39, and that can also be configured to be an integral unitary part of strap 39. First connector 40a can be made from a material that is the same or different than the material selected to make flexible retainer strap 39.

As further shown in FIG. 3, protective moisture dam assembly comprises second retainer 42 comprising second retainer wall 44 having a second retainer wall perimeter 44a. Second retainer wall 42 has a second retainer wall first side 46a (shown in FIG. 3 as the second retainer wall "exterior" side) having a second retainer wall first side ("exterior side/surface") perimeter 46b. Second retainer wall 44 further has second retainer wall second side 48a ("interior side/surface") having second retainer wall second side perimeter 48b, with the distance between the second retainer wall first side perimeter 46a and second retainer wall second side perimeter 48b defining second retainer wall thickness, "t2". FIG. 3 further shows second retainer through opening 50 bounded by the second retainer wall second side 48a (e.g., second retainer wall "interior" side), FIG. 4 is an illustration of a stage "A" that can be a first stage in the construction (e.g., assembly, etc.) of the protective moisture dam 20 of the type shown in FIG. 3 in an aircraft cabin monument assembly 13 of the type shown in FIG. 3. As shown in FIG. 4, a retainer/flexible sleeve component 60 (referred to equivalently herein as "sub-assembly 60") of the protective moisture dam assembly 20 is formed by bringing or otherwise directing the first retainer wall first side 26a of the first retainer wall 24 of the first retainer 22 into contact with flexible sleeve first end 36a of flexible sleeve 32. The flexible sleeve first end 36a can be retained in place against the outer wall of the first retainer (e.g., the first retainer wall first side 26a, or first retainer wall "exterior") through, for example, a friction fit, etc., as the flexible sleeve first end perimeter 36b of the flexible sleeve first end 36a is configured to mate with the first retainer wall 24. According to one example, the flexible sleeve first end 36a can be expanded in response to, for example, an applied "outward" force to slightly stretch the flexible sleeve first end outwardly, with the "upper" end of the flexible sleeve physically (e.g., manually, robotically, etc.) manipulated into position against, and/or otherwise adjacent to, the first retainer wall first side ("exterior").

In another example, the flexible sleeve first end perimeter 36b is dimensioned to substantially match the first retainer wall first side perimeter 26b dimension. As shown in FIG. 4, in stage "A" of the protective moisture dam assembly process, the flexible sleeve has been brought into contact with the first retainer 22 to form a first retainer/flexible sleeve component 60 (referred to equivalently herein as "sub-assembly 60") of the protective moisture dam assembly 20. The second retainer 42 is shown in FIG. 4 in a position where the second retainer 42 has not yet engaged the flexible sleeve 32 of the first retainer/flexible sleeve component 60.

FIG. 5 is an illustration of a next stage (stage "B") in the construction (e.g., the assembly, etc.) of the protective moisture dam 20 of the type shown in FIGS. 3, 4 in aircraft cabin monument assembly 13 of the type shown in FIGS. 3, 4. As shown in FIG. 5, a first retainer/flexible sleeve/second retainer component 70 (referred to equivalently herein as "sub-assembly 70") of the protective moisture dam assembly 20 is formed. That is, as shown in FIG. 5, previously formed sub-assembly 60 as described herein (at least with respect to the description provided of FIG. 4) was previously formed in stage "A" by bringing or otherwise directing first retainer wall first side 26a of the first retainer wall 24 of the first retainer 22 into contact with flexible sleeve first end 36a of flexible sleeve 32.

As shown in FIG. 5, in stage "B" of the assembly process, the second retainer 42 has now been brought to a position in the protective moisture dam assembly 20 where the second retainer 42 is engaged in direct communication with and is positioned immediately adjacent to the flexible sleeve first side (e.g., the "exterior" of the flexible sleeve 32), with the second retainer 42 having been moved in an "upward" direction along the flexible sleeve length toward the flexible sleeve first end ("upper" end) perimeter 36b (shown in FIG. 4). As shown in FIG. 5, the flexible sleeve second end 38a has been directed "into" and "through" the second retainer through opening 50 (shown in FIG. 4), with the second retainer 42 directed in an upward direction relative to the flexible sleeve 32, and from the flexible sleeve second end 38a ("lower" end) toward the flexible sleeve first end 36a ("upper" end), and with the second retainer 42, as shown in FIG. 5, configured to surround the exterior of the flexible sleeve first end 36a of flexible sleeve 32.

According to a present aspect, as the second retainer 42 is directed upwardly to an assembly position (e.g., a near "final" assembly position in stage "B" and prior to overall assembly 13 installation) at or near the flexible sleeve first end perimeter 38b of the flexible sleeve 32, the second retainer can also be brought to a position that can be in immediate contact with the underside of the first retainer flange 22b of the first retainer 22. In this example, as shown in FIG. 5, the protective dam assembly 20 comprises the flexible sleeve first end 36a interposed between the first retainer wall first side (e.g., the exterior of the first retainer wall) and the second retainer second side 48a (e.g., the interior of the second retainer wall) to form the first retainer/flexible sleeve/second retainer component 70 (referred to equivalently herein as "sub-assembly 70") of the protective moisture dam assembly 20.

As shown in FIG. 5, second retainer wall second side 48a of the second retainer wall 44 of the second retainer 42 is brought into contact with flexible sleeve first end 36a of flexible sleeve 32, and can be retained in place by, for example, a friction fit, etc. as the second retainer 42 is configured to mate with the first retainer wall 24 of the first retainer 22, with the flexible sleeve 32 interposed between the second retainer 42 interior (e.g., the second retainer wall second side 48a) and the first retainer wall exterior (e.g., the first retainer wall first side 26b). According to one example, the second retainer 42 can be expanded to a selected degree to "stretch" outwardly in response to, for example, an applied "outward" force to slightly stretch outwardly, with the second retainer physically (e.g., manually, robotically, etc.) and otherwise be manipulated into position against or otherwise adjacent to the flexible sleeve first side 34a (e.g., the flexible sleeve exterior) at the flexible sleeve first end 36a. In another example, depending upon the thickness of the flexible sleeve (e.g., having a flexible sleeve thickness from about 4 to about 8 mils), the second retainer wall second side perimeter 48b (e.g., the second retainer wall "inner" perimeter) is dimensioned to substantially and/or effectively match the first retainer wall first side perimeter 26b dimension (e.g., the first retainer wall outer perimeter).

As further shown in FIG. 5, aircraft cabin lavatory floor 14a comprises aircraft cabin lavatory floor through opening 14d having an aircraft cabin lavatory through opening perimeter 14e, with the aircraft cabin lavatory floor through opening 14d bounded by the surrounding aircraft cabin lavatory floor 14a. In one example, the flexible sleeve 32 is configured to have a dimensional footprint and perimeter that can pass through the aircraft cabin lavatory floor through opening 14d. That is, the flexible sleeve 32 can be made from a material that is robust enough to hold a selected dimensional form and otherwise have a flexible sleeve perimeter that can be accommodated by the dimension of the aircraft cabin lavatory floor though opening perimeter 14e.

In addition, in one example, in sub-assembly 70 (of the protective moisture dam assembly 20), the second retainer wall first side (exterior) perimeter 46b of the second retainer wall first side 46a can be dimensioned to closely and substantially match the aircraft cabin lavatory floor though opening perimeter 14e. In another example, the first retainer flange 24b is dimensioned to extend outwardly from the first retainer wall perimeter 24a to a distance that completely covers and otherwise overlaps the second retainer wall. That is, in one example, the first retainer flange 24b has a length and width that is greater than and extends beyond the second retainer wall first side perimeter 46b.

FIG. 6A is an elevated illustration ("slightly downward overhead view") of a next stage (stage "C") in the construction (e.g., the assembly, etc.) of the protective moisture dam 20 of the type shown in FIG. 3, 4, 5 in aircraft cabin assembly 13 of the type shown in FIGS. 3, 4, 5. As shown in FIG. 6A, in stage "C" of the assembly process, the protective moisture dam 20 (having the configuration of the sub-assembly 70) has been installed into aircraft cabin lavatory floor though opening 14e of aircraft cabin lavatory floor 14a (that can also be a through opening, if desired, of an aircraft cabin galley floor 16a).

As shown in FIG. 6A, first pipe 17 having first pipe first end 17a (of, for example, a plumbing assembly existing below an aircraft cabin monument floor) is visible at the aircraft cabin lavatory floor through opening 14d of through opening 14e (also shown in FIG. 6B). Also visible in FIG. 6A is the protective moisture dam 20 having the flexible sleeve 32 retained in position and otherwise interposed between first retainer 22 and second retainer 42 (second retainer 42 (shown in FIG. 6B). First retainer flange 24b is shown extending to a selected distance outwardly from first retainer wall 24 and first retainer wall perimeter 24a. As shown, according to a present aspect, first retainer flange 24b can serve act as a "lip" in intimate contact with aircraft lavatory floor 14a with first retainer flange 24b raised above the aircraft cabin lavatory floor first side 14b or aircraft cabin lavatory floor 14a.

As shown in FIG. 6A, in the "raised flange" configuration, the first retainer 22 provides a sealing capability to the protective moisture dam assembly 20 in an installed configuration that allows the protective dam assembly to be positioned immediately adjacent to, and to effectively seal the aircraft cabin lavatory floor through opening perimeter 14e (shown in FIG. 6B). In addition, (also not shown in FIG. 6A) when the protective dam assembly of FIG. 5 is inserted into the aircraft cabin lavatory floor through opening 14d, the second retainer wall first side perimeter (outer wall perimeter) can rest (e.g., can be compressed to rest) immediately adjacent to the aircraft cabin lavatory through opening perimeter 14e to form a seal at the aircraft cabin lavatory through opening perimeter 14e.

FIG. 6B is a cross-sectional view of the aircraft cabin assembly 13 comprising the protective moisture dam assembly 20 in an installed configuration in a floor assembly, and that is of the type shown in FIG. 6A, and is another view of assembly stage "C". As shown in FIG. 6B, first pipe 17 having first pipe first end 17a of, for example, a plumbing assembly existing below an aircraft cabin monument floor 14a is visible at the aircraft cabin lavatory floor through opening 14d having an aircraft cabin lavatory floor through opening perimeter 14e. Also visible is the protective moisture dam 20 having the flexible sleeve 32 retained in position and otherwise interposed between first retainer 22 and second retainer 42. First retainer flange 24b is shown extending to a selected distance outwardly from first retainer wall 24 and first retainer wall perimeter 24a. As shown in FIG. 6B, according to a present aspect, first retainer flange 24b is shown serving as a "lip" that is in intimate contact with aircraft lavatory floor 14a, with first retainer flange 24b raised above the aircraft cabin lavatory floor first side 14b or aircraft cabin lavatory floor 14a. The "raised flange" configuration of the first retainer 22 in position provides a sealing capability to the protective moisture dam assembly 20 in an installed configuration that allows the protective dam assembly to be positioned immediately adjacent to, and to effectively seal the aircraft cabin lavatory floor through opening perimeter (the aircraft cabin lavatory floor through opening perimeter not specifically shown in FIG. 6A). In addition, FIG. 6B shows the protective dam assembly of FIG. 5 inserted into the aircraft cabin lavatory floor through opening 14d such that the second retainer wall first side perimeter 46b can rest (e.g., can be compressed to rest) immediately adjacent to the aircraft cabin lavatory through opening perimeter 14e to form a seal at the aircraft cabin lavatory through opening perimeter.

FIG. 6C is a further elevated view (an overhead "downward" view) of stage "C" in the construction (e.g., the assembly, etc.) of the protective moisture dam 20 of the type shown in FIGS. 3, 4, 5, 6A, and 6B in aircraft cabin assembly 13 of the type shown in FIGS. 3, 4, 5, 6A, and 6B.

As shown in FIG. 6C, the flexible sleeve second side 34*b* of flexible sleeve 32 is more visible, and shows a view of flexible sleeve second end 38*a* in position below the floor surface and extending a distance beneath the floor surface. FIG. 6C further shows flexible sleeve second end slots 38*d* through which flexible sleeve retainer strap 39 can be inserted and held in position at or near the flexible sleeve second end 38*a*.

FIG. 7 shows a perspective and slightly elevated view of the protective moisture dam 20 of the type shown in FIGS. 3, 4, 5, 6A, 6B, and 6C, in aircraft cabin assembly 13 of FIGS. 6A, 6B, and 6C (of stage "C") now progressing to stage "D"; where plumbing that will remain in a position above the aircraft cabin lavatory floor 14*a* (or galley floor 16*a*, etc.) is connected to first pipe 17 at first pipe end 17*a*. As shown in FIG. 7, second pipe 18 at second pipe first end 18*a* can be fixedly attached to first pipe first end 17*a* of first pipe 17, and a feeder pipe 19 may be integrally associated with or otherwise incorporated into second pipe 18. The protective moisture dam assembly 20 of the type and of the installed configuration shown in FIGS. 6A, 6B, and 6C are also shown in FIG. 7. Second pipe 18 and feeder pipe 19 can represent the type of plumbing that can be further connected in an assembly (not shown) that is in communication with elements located within an aircraft cabin monument (e.g., aircraft cabin lavatory, aircraft cabin galley, etc.) that can include, for example, a urinal, a toilet, a sink, a water reservoir/tank, etc.).

FIGS. 8A, 8B, 8C show the aircraft cabin assembly 13 and the protective moisture dam assembly 20 of the type shown at least in FIG. 7, and now with the protective moisture dam assembly 20 directed into and otherwise configured to progress to an exemplary assembly progression denoted as stage "E". As shown in FIG. 8A, in stage "E", the flexible sleeve 32 can be "raised" from a position beneath the aircraft cabin lavatory floor 14*a* through aircraft cabin lavatory floor through opening 14*d* (now covered by flexible sleeve 32 and not visible in FIG. 8A). In this exemplary configuration, as shown in FIG. 8A, aircraft cabin assembly 13 is shown in an assembly progression stage "E" with the flexible sleeve second end 38*a* comprising flexible retaining strap 39 now visible (for the first time in the assembly sequence) in an orientation and in a directed or manipulated position that is "higher than" or that it is extended upwardly from the aircraft cabin lavatory floor 14*a* to a height that is "above" the flexible sleeve first end 36*a* (shown in FIG. 8C), with flexible sleeve first end remaining fixedly interposed (and not visible in FIG. 8A) between the first retainer 22 and the second retainer 42 (also not visible in FIG. 8A).

In this stage "E" configuration in the assembly progression, as the flexible sleeve is directed from below floor level to the position shown "above" floor level, according to present aspects, the flexible sleeve second side 34*b* that was previously positioned as an interior surface or interior side when the flexible sleeve was in stages "A", "B" "C", and "D" (in stages "C" and "D" located beneath the floor surface level) is now, in stage "E" the exterior surface of the flexible sleeve 32 as the orientation of the flexible sleeve surfaces (interior surface/side and exterior surface/side) is intentionally inverted. That is, in stage "E", the flexible is "pulled up", and/or otherwise elevated through the floor opening and the flexible sleeve second side 34*b* now becomes the "exterior" surface of the flexible sleeve 32, and flexible sleeve first side 34*a* (that was previously on the exterior of the flexible sleeve in stages "C" and "D") is now, in stage "E", located on the interior of the flexible sleeve 32 (as shown in FIG. 8C).

FIG. 8A further shows an end of flexible sleeve retainer strap 39 terminating at first connector 40*a* that is configured to mate with second connector 40*b* that is connected to a monument strap 40*c* that can be in communication with a monument fixture (e.g., monument wall, sink element, etc.) such that, when in a tightened configuration, flexible sleeve retainer strap 39 is also "tightened" or "cinched up" so that the flexible sleeve second end 38*a* can be retained snugly against, for example, plumbing or other monument fixtures that extend through a monument floor, etc. that can be of the type shown in FIG. 7 (e.g., second pipe 18, feeder pipe 19, etc.)

FIG. 8B is another view of the aircraft cabin assembly 13 of the type shown at least in FIG. 8A with the protective moisture dam assembly 20 in the exemplary assembly progression denoted as stage "E". As shown in FIG. 8B, flexible retainer strap 39 is connected to aircraft cabin monument wall 12*a* (using any suitable fastening/attachment element to cabin monument wall 12*a*, including, for example, a rivet, a screw, a bolt, or fastener equivalents thereof, etc.) with flexible sleeve retainer strap first connector 40*a* engaged with second connector 40*b* and with second connector in direct communication with and otherwise fastened directly or indirectly to aircraft cabin monument wall 12*a*. The flexible retainer strap 39 can have a length that is adjustable such that, a selected length of the flexible retainer strap 39 can engage and otherwise adjustably attach to a feature of an adjacent aircraft cabin monument fixture (e.g., a monument wall, etc.) for the purpose of providing sufficient tension on the flexible sleeve retainer strap to alter an initial dimension of the flexible sleeve second end perimeter 38*b* of the flexible sleeve second end 38*a* (e.g., to decrease the initial diameter of the flexible sleeve second end opening 38*c* to a selected smaller flexible sleeve second opening diameter, etc.).

FIG. 8C is a partial cross-sectional side view of the aircraft cabin assembly 13 of the type shown in FIGS. 8A, 8B, with the aircraft cabin assembly 13 comprising the protective moisture dam assembly 20 of the type shown in FIG. 8A, 8B. As perhaps more visible in FIG. 8C, aircraft cabin lavatory floor through opening perimeter 14*e* of the aircraft cabin lavatory floor 14*a* is shown immediately bordered by second retainer 42, with the flexible sleeve 32 fixedly (and if desired, removably) interposed between second retainer 42 and first retainer 22. In this configuration, protective moisture dam assembly 20 comprises a moisture/fluid redirection zone at the flexible sleeve/first retainer wall second side interface 21. According to present aspects, gravity will direct fluid and/or moisture that contacts or collects on the flexible sleeve second side 34*b* toward the flexible sleeve/first retainer wall second side interface 21.

As shown in FIG. 8C, the present apparatuses, systems, and methods, substantially completely prevent and/or impede fluid and/or moisture from passing through the floor opening at the flexible sleeve/first retainer wall second side interface 21. That is, according to present aspects, any fluid in the vicinity of a floor through opening in an aircraft cabin assembly cannot proceed from within the aircraft cabin monument to regions beneath the aircraft cabin monument floor through the floor through opening 14*d*, for example, into compartments(s) located beneath the aircraft cabin lavatory floor 14*a* (and that may house equipment, for example, equipment sensitive to and/or that can be damaged as a result of, the passage of fluid/moisture into such compartment(s)). Such compartments located beneath aircraft cabin floors and into which fluids/moisture is not desired can house, for example, electronics, critical flight equipment, batteries, electrical power sources, and connections, wiring, etc.

According to present aspects, other configurations of the protective moisture dam assembly are possible and contemplated. FIGS. 9, 10, 11, 12A, 12B, 13, 14A, and 14B represent and illustrate an alternate arrangement and relative positioning of first and second retainers in combination with the flexible sleeve in protective moisture dam assembly 120 that can be incorporated into aircraft cabin assembly 113. That is, according to an alternate aspect, the orientation of the first and second retainers (with respect to the flexible sleeve) can be reversed as compared to the relative orientation of the first retainer, second retainer rand flexible sleeve shown in FIGS. 3, 4, 5, 6A, 6B, 7, 8A, 8B, and 8C. Unless otherwise noted, the numbers listed to denote parts and features in the assemblies shown in FIGS. 9, 10, 11, 12A, 12B, 13, 14A, and 14B are the same as numbers listed to denote parts and features in the assemblies shown in FIGS. 1, 2, 3, 4, 5, 6A, 6B, 6C, 7, 8A, 8B, and 8C.

One difference shown in FIGS. 9, 10, 11, 12A, 12B, 13, 14A, and 14B from protective moisture dam assembly 20 is that, protective moisture dam assembly 120 depicts the orientation of the first retainer 22 positioned immediately adjacent to the aircraft cabin lavatory floor through opening perimeter 14e, and with the flexible sleeve 32 interposed between the first retainer wall second side 28a (the first retainer "inner wall") and the second retainer wall first side 46a (the second retainer "outer" wall). This is contrasted with the protective moisture dam assembly 20 (an aircraft assembly 13) where the second retainer 42 is positioned immediately adjacent the aircraft cabin lavatory floor through opening perimeter 14e, with the flexible sleeve 32 interposed between the first retainer wall first side 26a (first retainer "outer" wall) and the second retainer wall second side 48a (second retainer "inner" wall).

According to this alternate aspect, FIG. 9 shows an exploded view of a present moisture dam assembly 120 that can be installed into an aircraft cabin monument 113, such as an aircraft cabin monument (lavatory, galley, etc.) assembly that is incorporated or otherwise brought into contact with and comprises a section of an aircraft cabin monument floor to form an aircraft cabin assembly 13. As shown in FIG. 9, protective moisture dam assembly 120 (referred to equivalently herein as "moisture dam assembly") comprises a first retainer 22 and second retainer 42 brought into contact with flexible sleeve 32. FIGS. 9, 10, 11, depict a progression of illustrative assembly "stages A1, B1, C1, D1, and E1)" for assembling the protective moisture dam assembly 120, with FIG. 12A showing the moisture dam assembly 120 finally positioned (stage "E1") within an aircraft monument floor section that can be an aircraft cabin lavatory floor 14a (of an aircraft cabin lavatory 14 that can have an aircraft cabin lavatory floor through opening 14d), aircraft cabin galley floor 16a (of an aircraft cabin galley 16 that can have an aircraft cabin galley floor through opening 16b), etc.

As shown in FIG. 9, a floor section that can be an aircraft cabin lavatory floor 14a comprises an aircraft cabin lavatory first side 14b (referred to equivalently herein as an aircraft cabin lavatory "upper" side, "upper floor surface", "exposed floor surface"), and an aircraft cabin lavatory second side 14c (referred to equivalently herein as an aircraft cabin lavatory "lower" side, "lower floor surface", "unexposed floor surface"), with the first and second floor sides 14b, 14c, shown in further detail in FIG. 14B. According to present aspects, the floor section shown relates to a section of an aircraft cabin monument assembly floor through which a plumbing line passes, with the plumbing line (referred to equivalently herein as a "plumbing assembly") to configured to deliver a fluid (e.g., water, etc.) to or away from an aircraft monument, or to facilitate collection of a fluid (water, wastewater, etc.) from an aircraft monument such as, for example, an aircraft cabin lavatory, galley, etc.). The enumerated elements shown in FIG. 9 are described with respect to the description of FIG. 3, provided herein. The positioning of second retainer 42 differs from that shown in FIG. 3, and the dimension (at least the outer perimeter) of second retainer 42 with respect to first retainer 22 also differs from that shown in FIG. 3.

FIG. 10 is an illustration of a stage "A1" that can be a first stage in the construction (e.g., assembly, etc.) of the protective moisture dam 120 of the type shown in FIG. 9 in aircraft cabin monument assembly 113 of the type shown in FIG. 9. As shown in FIG. 10, a retainer/flexible sleeve component 160 (referred to equivalently herein as "sub-assembly 160") of the protective moisture dam assembly 120 is formed by bringing or otherwise directing the first retainer wall second side 28a (the interior wall side) of the first retainer wall 24 of the first retainer 22 into contact with the flexible sleeve first side 34a of flexible sleeve first end 36a of flexible sleeve 32. In this aspect, the flexible sleeve first end 36a can be positioned in place against the "inner" wall of the first retainer (e.g., the first retainer wall second side 28a, also referred to equivalently as the first retainer wall "interior") as the flexible sleeve first end perimeter 36b of the flexible sleeve first end 36a is configured to mate with the first retainer wall second side 28b. According to one example, the flexible sleeve first end 36a can be manipulated into position against or otherwise adjacent to the first retainer wall second side ("interior") 28b. In another example, the flexible sleeve first end perimeter 36b is dimensioned to substantially match the first retainer wall second side perimeter 28b dimension. As shown in FIG. 10, the flexible sleeve has been brought into contact with the first retainer 22 to form a first retainer/flexible sleeve component 160 (referred to equivalently herein as "sub-assembly 160") of the protective moisture dam assembly 120. The second retainer 42 is shown in FIG. 10 in a position where the second retainer 42 has not yet engaged the flexible sleeve 32 of the first retainer/flexible sleeve component 160 (sub-assembly 160). In still another aspect, although not shown, in stage A1 the flexible sleeve 32 can first engage the second retainer wall first side 46b (the "second retainer wall "exterior").

FIG. 11 is an illustration of a next stage, stage "B1" in the construction (e.g., the assembly, etc.) of the protective moisture dam 120 of the type shown in FIGS. 9, 10 in aircraft cabin monument assembly 113 of the type shown in FIGS. 9, 10. As shown in FIG. 11, a first retainer/flexible sleeve/second retainer component 170 (referred to equivalently herein as "sub-assembly 170") of the protective moisture dam assembly 120 is formed. That is, as shown in FIG. 11, sub-assembly 160 has been formed as described herein (at least with respect to the description provided of FIG. 10) by bringing or otherwise directing first retainer wall second side 28a of the first retainer wall 24 of the first retainer 22 into contact with flexible sleeve first end 36a of flexible sleeve 32.

As shown in FIG. 11, in stage "B1" of the assembly process, the second retainer 42 has now been brought to a position in the protective moisture dam assembly 120 where the second retainer 42 is engaged in direct communication with and is positioned immediately adjacent to the flexible sleeve second side (e.g., the "interior" of the flexible sleeve 32), with the second retainer 42 having been moved in a "downward" direction toward the flexible sleeve first end ("upper" end) perimeter. As shown in FIG. 11, in this alternate aspect, the second retainer 42 is directed "downwardly" to an assembly position (e.g., a near "final" assembly position prior to installation) at or near the flexible sleeve first end perimeter 38b of the flexible sleeve 32 such that the second retainer wall first side 46b (exterior) of the second retainer 42 is brought to a position that can be in immediate contact with the flexible sleeve first end 36a of flexible sleeve 32 interposed between the first retainer wall second side 28a (e.g., the interior of the first retainer wall) and the second retainer wall first side 46a (e.g., the exterior of the second retainer wall 44 of the second retainer 42) to form the first retainer/flexible sleeve/second retainer component 170 (referred to equivalently herein as "sub-assembly 170") of the protective moisture dam assembly 120.

As shown in FIG. 11, second retainer wall first side 46a of the second retainer wall 44 of the second retainer 42 is brought into contact with flexible sleeve (interior) second side 34b at the flexible sleeve first end 36a of flexible sleeve 32, and can be retained in place by, for example, a friction fit, etc. with the second retainer 42, as the second retainer 42 is physically (e.g., manually, robotically, etc.) and otherwise be manipulated into position against or otherwise adjacent to the flexible sleeve second side 34b (e.g., the flexible sleeve exterior) at the flexible sleeve first end 36a. In another example, depending upon the thickness of the flexible sleeve (the flexible sleeve thickness ranging, for example, from about 4 to about 8 mils, etc.), the second retainer wall first side perimeter 46b (e.g., the second retainer wall "outer" perimeter) is dimensioned to substantially match the first retainer wall second side perimeter 28b dimension (e.g., the first retainer wall inner perimeter).

As further shown in FIG. 11 (and in this regard, substantially identical to that shown in FIG. 5) aircraft cabin lavatory floor 14a comprises aircraft cabin lavatory floor through opening 14d having an aircraft cabin lavatory through opening perimeter 14e, with the aircraft cabin lavatory floor through opening 14d bounded by the surrounding aircraft cabin lavatory floor 14a. In one example, the flexible sleeve 32 can be made from a material that is robust enough to hold a selected dimensional form and otherwise have a flexible sleeve perimeter that can be accommodated by the dimension of the aircraft cabin lavatory floor though opening perimeter 14e. In addition, in one example, in sub-assembly 170 (of the protective moisture dam assembly 120), the first retainer wall first side (exterior) perimeter 26b can be dimensioned to closely and substantially match the aircraft cabin lavatory floor though opening perimeter 14e dimension.

FIG. 12A is an elevated illustration ("slightly downward") of a next stage (stage "C1") in the construction (e.g., the assembly, etc.) of the protective moisture dam assembly 120 of the type shown in FIG. 9, 10, 11 in aircraft cabin assembly 113 of the type shown in FIGS. 9, 10, 11. As shown in FIG. 12A, in stage "C1" of the assembly process, the protective moisture dam assembly 120 (having sub-assembly 170) has been installed into aircraft cabin lavatory floor though opening 14d of aircraft cabin lavatory floor 14a (that can also be a through opening, if desired, of an aircraft cabin galley floor 16a).

As shown in FIG. 12A, first pipe 17 having first pipe first end 17a (of, for example, a plumbing assembly existing below an aircraft cabin monument floor) is visible at the aircraft cabin lavatory floor through opening 14d. Also visible is the protective moisture dam 120 having the flexible sleeve 32 retained in position and otherwise interposed between first retainer 22 and second retainer 42. First retainer flange 24b is shown extending to a selected distance outwardly from first retainer wall 24 (not visible in FIG. 12A). As shown in FIG. 12A, according to a present aspect, first retainer flange 24b can serve act as a "lip" in intimate contact with aircraft lavatory floor 14a with first retainer flange 24b raised above the aircraft cabin lavatory floor first side 14b or aircraft cabin lavatory floor 14a. In the "raised flange" configuration, the first retainer 22 provides a sealing capability to the protective moisture dam assembly 120 in an installed configuration that allows the protective dam assembly to be positioned immediately adjacent to, and to effectively and substantially seal the aircraft cabin lavatory floor (from a fluid/moisture penetration or fluid/moisture flow-through via the floor through opening) along the floor through opening perimeter (the aircraft cabin lavatory floor through opening perimeter not specifically shown in FIG. 12A).

In addition, (also not shown in FIG. 12A) when the protective dam assembly 120 of FIG. 11 is inserted into the aircraft cabin lavatory floor through opening 14d, the second retainer wall first side perimeter can rest (e.g., can be compressed to rest) immediately adjacent to the flexible sleeve second side 34b and the first retainer wall first side (exterior) can rest in intimate contact with aircraft cabin lavatory floor through opening perimeter 14e to form a seal at the aircraft cabin lavatory floor through opening perimeter 14e.

FIG. 12B is a cross-sectional view of a stage "C1" of the aircraft cabin assembly 113 comprising the protective moisture dam assembly 120 in an installed configuration in a floor assembly, and that is of the type shown in FIG. 12A. As shown in FIG. 12B, first pipe 17 having first pipe first end 17a of, for example, a plumbing assembly existing below an aircraft cabin monument floor 14a is visible at the aircraft cabin lavatory floor through opening 14d having an aircraft cabin lavatory floor through opening perimeter 14e. Also visible is the protective moisture dam 120 having the flexible sleeve 32 retained in position and otherwise interposed between first retainer 22 and second retainer 42. First retainer flange 24b is shown extending to a selected distance outwardly from first retainer wall 24 and first retainer wall perimeter 24a.

As shown in FIGS. 12A, 12B, according to a present aspect, first retainer flange 24b is shown serving as a "lip" that is in intimate contact with aircraft lavatory floor 14a, with first retainer flange 24b raised above the aircraft cabin lavatory floor first side 14b or aircraft cabin lavatory floor 14a. The "raised flange" configuration of the first retainer 22 and second retainer 42 in position provides a sealing capability to the protective moisture dam assembly 120 in an installed configuration that allows the protective dam assembly to be positioned immediately adjacent to, and to effectively seal the aircraft cabin lavatory floor through opening. In addition, FIG. 12B shows the protective dam assembly 120 of FIG. 11 inserted into the aircraft cabin lavatory floor through opening 14d, such that the first retainer wall first side perimeter 26b of the first retainer wall first side 26a (first retainer wall "exterior") can rest (e.g., can be compressed to rest, etc.) immediately adjacent to the aircraft cabin lavatory through opening perimeter 14e to form a fluid/moisture seal at the aircraft cabin lavatory through opening perimeter 14e.

FIG. 13 shows the aircraft cabin assembly 113 of FIGS. 12A, 12B (of stage "C1") now progressing to stage "D1", where plumbing that will remain in a position above the aircraft cabin lavatory floor 14a (or galley floor 16a, etc.) is connected to first pipe 17 at first pipe end 17a. As shown in FIG. 13, second pipe 18 at second pipe first end 18a can be fixedly attached to first pipe 17 and a feeder pipe 19 may be integrally associated or otherwise incorporated into second pipe 18. The protective moisture dam assembly 120 of the type and of the installed configuration shown in FIGS. 12A and 12B are also shown in FIG. 13. Second pipe 18 and feeder pipe 19 can represent the type of plumbing that can be further connected in an assembly (not shown) that is in communication with elements of an aircraft cabin monument (e.g., aircraft cabin lavatory, aircraft cabin galley, etc.) that can include, for example, a urinal, a toilet, a sink, a water reservoir/tank, etc.).

FIGS. 14A, 14B, show the aircraft cabin assembly 113 of the type shown at least in FIG. 13, and now with the protective moisture dam assembly 120 directed into and otherwise configured to progress to an exemplary assembly progression denoted as stage "E1", where the flexible sleeve 32 can be "raised" or "elevated" from a position beneath the aircraft cabin lavatory floor 14a through aircraft cabin lavatory floor through opening 14d that is now "blocked" by the flexible sleeve 32.

In this exemplary configuration, as shown in FIG. 14A, protective moisture dam assembly 120 of aircraft cabin assembly 113 is shown in an assembly progression stage "E1" with the flexible sleeve second end 38a comprising flexible retaining strap 39 now visible (for the first time in the assembly sequence) in an orientation and in a directed or manipulated position that is "higher than" or that it is extended upwardly from the aircraft cabin lavatory floor 14a to a height that is "above" the flexible sleeve first end 36a, with flexible sleeve first end 36a remaining fixedly interposed between the first retainer 22 and the second retainer 42.

In this stage "E1" configuration in the assembly progression, as the flexible sleeve is directed from below floor level to the position shown "above" floor level, according to present aspects, the flexible sleeve second side 34b that was previously positioned as an interior surface or interior side when the flexible sleeve was in stages "A1", "B1" "C1", and "D1" (in stages "C1" and "D1" located beneath the floor surface level) now becomes the exterior surface of the flexible sleeve 32 as the orientation of the flexible sleeve surfaces (interior surface/side and exterior surface/side) is intentionally inverted is inverted. That is, in stage "E1", the flexible sleeve 32 is pulled up through the floor opening and the flexible sleeve second side 34b now becomes the "exterior" surface of the flexible sleeve 32, and flexible sleeve first side 34a (that was previously on the exterior of the flexible sleeve in stages "C1" and "D1") is now, in stage "E1", located on the interior of the flexible sleeve 32 (and is not visible in FIG. 14A).

FIG. 14A further shows an end of flexible sleeve retainer strap 39 terminating at first connector 40a that is configured to mate with second connector 40b that is connected to a monument strap 40c that can be in communication with and fixedly attached to, for example a monument fixture, shown as aircraft cabin monument wall 12a (but that can also be, for example, monument wall, sink element, etc.) such that, when placed into a tightened configuration as shown in FIG. 14A, flexible sleeve retainer strap 39 can be "tightened" or "cinched up" so that the flexible sleeve second end 38a can be retained snugly against, for example, plumbing or other monument fixtures that extend through a monument floor, etc. that can be of the type shown, for example, in FIG. 13 (e.g., second pipe 18, feeder pipe 19, etc.)

As shown in FIG. 14A, the flexible retainer strap 39 can have a length that is adjustable such that, a selected adjustable length of the flexible retainer strap 39 can engage and otherwise attach to a feature of an adjacent aircraft cabin monument fixture (e.g., a monument wall, etc.) at least for the purpose of providing sufficient tension on the flexible sleeve retainer strap 39 to alter an initial dimension of the flexible sleeve second end perimeter 38b of the flexible sleeve second end 38a (e.g., decrease the diameter of the flexible sleeve second end opening 38c to a selected smaller diameter, etc.).

FIG. 14B is a partial cross-sectional side view of the aircraft cabin assembly 113 of the type shown in FIG. 14A, with the aircraft cabin assembly 113 comprising the protective moisture dam assembly 120 in stage "E1". As perhaps more visible in FIG. 14B, aircraft cabin lavatory floor through opening perimeter 14e of the aircraft cabin floor though opening 14d of aircraft cabin lavatory floor 14a is shown immediately bordered by first retainer 22, with the flexible sleeve 32 fixedly (and if desired, removably) interposed between second retainer 42 and first retainer 22. In this configuration, protective moisture dam assembly 120 comprises a moisture/fluid redirection zone at the flexible sleeve/second retainer wall second side interface 121. According to present aspects, gravity will direct fluid and/or moisture that contacts or collects on the flexible sleeve second side 34b toward the flexible sleeve/first second retainer wall second side interface 121.

As shown in FIG. 14B, the present apparatuses, systems, and methods, substantially completely prevented and/or impeded from passing through the floor opening at the flexible sleeve/second retainer wall second side (interior side) interface 121. That is, according to present aspects, any fluid and/or moisture in the vicinity of a floor through opening in an aircraft cabin assembly cannot proceed from within the aircraft cabin monument to regions beneath the aircraft cabin monument floor through the floor through opening 14d, for example, into compartments(s) located beneath the aircraft cabin lavatory floor 14a and that may house equipment, for example, equipment sensitive to and/or that can be damaged as a result of, the passage of fluid/moisture into such compartment(s). Such compartments located beneath aircraft cabin floors and into which fluids/moisture is not desired can house electronics, critical flight equipment, batteries, electrical power source, wiring, etc.

The first and second retainers can be made from any resilient material and can be made from a material that will deform, at least to a selected extent, under compressive pressure, and that will return toward an original non-deformed dimension in the absence of or in the lessening of compressive pressure. Such materials can include open and/or closed cell foams, rubbers, plastics, silicone-containing materials, etc. At least one of the first and second retainers can be made from a resilient material having a selected elastic deformation in the presence of a compressible force, and can have a commensurate selected Young's modulus such that the first retainer can repeatedly and reversibly compress, and then, in the absence of, or amelioration of, a compressive force, can expand outwardly toward an original configuration and footprint that is close to an original retainer footprint and/or dimension of the first and/or second retainer.

According to a further aspect, the disclosed first and second retainer can be impervious to water. In addition, while the presently illustrated first and second retainers are shown as being rectangular in shape, present aspects contemplate the first and second retainers having a complementary dimension configured to mate with one another, for example, in a frictional fit. That is, according to present aspects, the aircraft cabin floor through opening can be any geometric shape or an irregular shape (e.g., circular, annular, elliptical, rectangular, triangular, irregularly-shaped, etc.), with the wall perimeters of the first and second retainers dimensioned to closely match the geometry of the floor through opening, and each other.

According to present aspects, at least one of the first and second retainer can have an outer perimeter that is complementary to the dimension of a through opening perimeter in a structure that can be for example, a floor structure of an aircraft cabin monument, such that at least one of the first and second retainer can have an outer perimeter that closely matches, or that can be slightly larger than, a floor through opening perimeter, and that can be deformed under compressive pressure to compress into a dimension or "footprint" required to fixedly (and if desired, removably) retain the retainer within the floor through opening perimeter, for example, in a frictional fit. The construction of the disclosed protective moisture dam assemblies greatly facilitates installation, retrofitting, rework, replacement, servicing, maintenance, etc., as the assembly retainers and sleeve can be fixedly retained in place and also be removable without damage to the retainers and/or the flexible sleeve, or any plumbing, or the flooring in an aircraft cabin monument.

Without being limited to any particular theory, according to present aspects, the positional retention of the flexible sleeve in the moisture dam assembly against the retainers as well as the superior capacity to impede moisture/fluid flow past present moisture dam assemblies can result from the physical orientation of the flexible sleeve surrounding (or "wrapping around") a majority (e.g., at least three sides, etc.) of at least one of the first retainer and the second retainer.

In another example, the retainers can be affixed to the floor through opening along the floor through opening perimeter by applying an adhesive material (that can be impervious to fluids/moisture) to the outer perimeter of one or more of the first and second retainer, or to the floor through opening perimeter, or by applying an adhesive material to both of at least one retainer outer perimeter and the floor through opening perimeter.

According to one example, in view of overall assembly weight and assembly complexity and cost considerations, the present aircraft cabin assemblies comprising the present protective moisture dam assemblies (and/or the protective moisture dam assemblies themselves) are configured to inhibit a moisture/fluid from proceeding (e.g., "flowing") from an aircraft monument, through an aircraft monument floor through opening, and into another compartment adjacent to the monument without incorporating adhesive layers or materials between or in contact with the protective moisture dam assemblies and a structural component comprising the protective moisture dam assemblies.

The flexible sleeve can be made from a material that is impervious to water and/or moisture. The flexible sleeve can be extruded into, or can be formed from a material sheet into, for example, a tubular configuration. In addition, the first and second flexible sleeve ends can have the same or different diameters at the first and second flexible sleeve end openings e.g., at the flexible sleeve first and second end perimeters, etc.). When the flexible sleeve end openings have a differing diameter, the flexible sleeve can be in the shape of a cone that can be referred to equivalently herein as "frustoconical. According to present aspects, the term "frustoconical" means having the shape of a frustum or cone.

The flexible sleeve can have a thickness that can be retained or otherwise interposed between the first and second retainer, for example, in a frictional fit between the first and second retainers. In one example, the flexible sleeve can have an average flexible sleeve wall thickness ranging from about 4 mils to about 8 mils thick. The flexible sleeve can have a selected length extending from the flexible sleeve first end to the flexible sleeve second end.

Further present aspects incorporate a fungicide and/or bactericide into one or more of the flexible sleeve and the first retainer and the second retainer materials at least for the purpose of extending the useful life of the protective moisture dam assemblies (e.g., by inhibiting bacterial and/or fungal growth on components incorporated into the protective moisture dam assemblies, etc.).

FIGS. 15, 16, and 17 are flowcharts generally describing methods according to present aspects. FIG. 15 outlines a method 200 for preventing moisture from passing through an aircraft cabin monument floor opening in an aircraft cabin floor (e.g., an aircraft cabin lavatory, an aircraft cabin galley, etc.). Method 200 includes installing 202 a moisture dam assembly into an aircraft cabin monument floor, with the aircraft cabin floor including an aircraft cabin floor opening, and with the moisture dam assembly including with the moisture dam assembly including a first retainer, with the first retainer including a first retainer wall, with the first retainer wall including a first retainer wall first side perimeter (referred to equivalently herein as a "first retainer wall first side outer perimeter"), and a first retainer wall second side (inner) perimeter (referred to equivalently herein as a "first retainer first wall second side inner perimeter"), with the first retainer second side perimeter defining a first retainer through opening, and with the first retainer further comprising a first retainer flange that can be integral with the first retainer, with the first retainer flange configured to contact the aircraft compartment floor first side, and with the first retainer flange further dimensioned to retain the first retainer within the aircraft cabin floor through opening. The moisture dam assembly further includes a second retainer, with the second retainer including a second retainer wall, with the second retainer wall including a second retainer wall first side perimeter and a second retainer wall second side perimeter, with the second retainer wall configured to mate with said first retainer wall. The moisture dam assembly further includes a flexible sleeve that can be a tubular flexible sleeve, with the flexible sleeve including a flexible sleeve first side and a flexible sleeve second side, and with the flexible sleeve further comprising a flexible sleeve first end having a flexible sleeve first end perimeter at a flexible sleeve first end opening, and with the flexible sleeve further including a flexible sleeve second end having a sleeve second end perimeter at a flexible sleeve second end opening. The flexible sleeve first end perimeter is fixedly, and can further be removably. interposed between said first retainer wall and said second retainer wall. The moisture dam assembly further includes a flexible sleeve retainer strap configured to engage the flexible sleeve second end, with the flexible sleeve retainer strap further configured to reduce a dimension of the flexible sleeve second end perimeter.

In another aspect, FIG. 16 outlines a method 300 that includes the step 202 of method 200 and additionally includes preventing 304 fluid/moisture flow from passing through an aircraft cabin monument floor opening and into an adjoining compartment that can be located beneath an aircraft cabin floor.

In another aspect, FIG. 17 outlines a method 400 including the step 202 of methods 200 and 300 and further comprises sealing 402 an aircraft cabin floor opening to a first retainer/flexible sleeve/second retainer interface of the presently disclosed protective moisture dam assembly at an aircraft cabin floor opening perimeter of an aircraft cabin floor through opening.

The methods outlined in FIGS. 15, 16, and 17 are understood to incorporate the protective moisture dam assemblies and the aircraft cabin assemblies incorporating the protective moisture dam assemblies, and aircraft comprising the aircraft cabin assemblies, shown at least in one or more of FIGS. 1, 2, 3, 4, 5, 6A, 6B, 6C, 7, 8A, 8B, 8C, 9, 10, 11, 12A, 12B, 13, 14A, and 14B.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The present aspects can, of course, be carried out in other ways than those specifically set forth herein without departing from essential characteristics of the aspects of the disclosure. The present aspects are to be considered in all respects as illustrative and not restrictive, and all changes coming within the meaning and equivalency range of the appended claims are intended to be embraced therein.

What is claimed is:

1. An aircraft cabin assembly comprising:
   an aircraft cabin floor, said aircraft cabin floor comprising an aircraft cabin floor first side and an aircraft cabin floor second side, said aircraft cabin floor further comprising an aircraft cabin floor through opening, said aircraft cabin floor through opening extending through a thickness of the aircraft cabin floor from the aircraft cabin floor first side to the aircraft cabin floor second side, said aircraft cabin floor through opening comprising an aircraft cabin floor through opening perimeter;
   a moisture dam assembly, said moisture dam assembly fixedly and removably attached to the aircraft cabin floor through opening perimeter, said moisture dam assembly comprising:
      a first retainer, said first retainer comprising a first retainer wall, said first retainer wall comprising a first retainer wall first side having a first retainer wall first side perimeter, said first retainer wall further comprising a first retainer second side having a first retainer wall second side perimeter, said first retainer wall second side perimeter defining a first retainer through opening, said first retainer further comprising a first retainer flange, said first retainer flange configured to contact the aircraft cabin floor first side, said first retainer flange further dimensioned to retain the first retainer within the aircraft cabin floor through opening;
      a second retainer, said second retainer comprising a second retainer wall, said second retainer wall comprising a second retainer wall first side having a second retainer wall first side perimeter, said second retainer wall further comprising a second retainer wall second side having a second retainer wall second side perimeter, said second retainer wall configured to mate with said first retainer wall;
      a flexible sleeve, said flexible sleeve comprising a flexible sleeve first side and a flexible sleeve second side, said flexible sleeve further comprising a flexible sleeve first end having a flexible sleeve first end perimeter, said flexible sleeve further comprising a flexible sleeve second end having a flexible sleeve second end perimeter, said flexible sleeve first end perimeter fixedly interposed between said first retainer wall and said second retainer wall;
      a flexible sleeve retainer strap configured to engage said flexible sleeve second end, said flexible sleeve retainer strap further configured to alter a dimension of the flexible sleeve second end perimeter, said flexible sleeve retainer further comprising a first connector,
      a monument strap fixedly attached to a monument fixture, said monument strap further comprising a second connector; and
      wherein said first connector is configured to removably mate with said second connector.

2. The aircraft cabin assembly of claim 1, wherein said flexible sleeve first end perimeter is fixedly interposed between said first retainer wall first side and said second retainer wall second side.

3. The aircraft cabin assembly of claim 1, wherein said flexible sleeve first end perimeter is fixedly interposed between said first retainer wall second side and said second retainer wall first side.

4. The aircraft cabin assembly of claim 1, wherein said flexible sleeve further comprises a flexible sleeve selected length, said flexible sleeve selected length extending from the flexible sleeve first end to the flexible sleeve second end.

5. The aircraft cabin assembly of claim 1, wherein said second retainer is configured to mate with said first retainer, said flexible sleeve first end configured to be fixedly and removably retained in a frictional fit between said first retainer and said second retainer.

6. The aircraft cabin assembly of claim 1, wherein said flexible sleeve comprises a tubular configuration.

7. The aircraft cabin assembly of claim 6, wherein said tubular configuration comprises a frustoconical configuration.

8. An aircraft comprising the aircraft cabin assembly of claim 1.

9. The aircraft cabin assembly of claim 1, wherein said monument fixture is an aircraft cabin monument wall.

10. An apparatus comprising:
    a moisture dam assembly, said moisture dam assembly configured to fixedly and removably attach to an aircraft cabin floor, said moisture dam assembly comprising:
       a first retainer, said first retainer comprising a first retainer wall, said first retainer wall comprising a first retainer wall first side having a first retainer wall first side perimeter, said first retainer wall further comprising a first retainer wall second side having a first retainer wall second side perimeter, said first retainer wall second side defining a first retainer through opening, said first retainer further comprising a first retainer flange, said first retainer flange configured to contact an aircraft compartment floor first side, said first retainer flange further dimensioned to retain the first retainer within an aircraft cabin floor through opening;
       a second retainer, said second retainer comprising a second retainer wall, said second retainer wall comprising a second retainer wall first side having a second retainer wall first side perimeter, said second retainer wall further comprising a second retainer wall second side having a second retainer wall second side perimeter, said second retainer wall configured to mate with said first retainer wall;
- a flexible sleeve, said flexible sleeve comprising a flexible sleeve first side and a flexible sleeve second side, said flexible sleeve further comprising a flexible sleeve first end having a flexible sleeve first end perimeter, said flexible sleeve further comprising a flexible sleeve second end having a flexible sleeve second end perimeter, said flexible sleeve first end perimeter fixedly interposed between said first retainer wall and said second retainer wall;
- a flexible sleeve retainer strap in communication with said flexible sleeve second end, said flexible sleeve retainer strap further configured to alter a dimension of the flexible sleeve second end perimeter, said flexible retainer strap further comprising a first connector, one end of the first connector terminating at said first connector;
- a monument strap fixedly attached to a monument fixture, said monument strap further comprising a second connector; and
- wherein said first connector is configured to removably mate with said second connector.

11. The apparatus of claim 10, wherein said flexible sleeve first end perimeter is fixedly interposed between said first retainer wall first side and said second retainer wall second side.

12. The apparatus of claim 10, wherein said flexible sleeve first end perimeter is fixedly interposed between said first retainer wall second side and said second retainer wall first side.

13. The apparatus of claim 10, wherein said flexible sleeve further comprises a flexible sleeve selected length, said flexible sleeve selected length extending from the flexible sleeve first end to the flexible sleeve second end.

14. The apparatus of claim 10, wherein said second retainer is configured to mate with said first retainer, said flexible sleeve first end configured to be fixedly and removably retained in a frictional fit between said first retainer and said second retainer.

15. The apparatus of claim 10, wherein said flexible sleeve comprises a tubular configuration.

16. The apparatus of claim 15, wherein said tubular configuration comprises a frustoconical configuration.

17. The apparatus of claim 10, wherein said monument fixture is an aircraft cabin monument wall.

18. A method comprising:
- installing a moisture dam assembly into an aircraft cabin floor, said aircraft cabin floor comprising an aircraft cabin floor opening, said moisture dam assembly comprising:
  - a first retainer, said first retainer comprising a first retainer wall, said first retainer wall comprising a first retainer wall first side having a first retainer wall first side perimeter, said first retainer wall further comprising a first retainer wall second side having a first retainer wall second side perimeter, said first retainer wall second side defining a first retainer through opening, said first retainer further comprising a first retainer flange, said first retainer flange configured to contact an aircraft compartment floor first side, said first retainer flange further dimensioned to retain the first retainer within an aircraft cabin floor through opening;
  - a second retainer, said second retainer comprising a second retainer wall, said second retainer wall comprising a second retainer wall first side having a second retainer wall first side perimeter, said second retainer wall further comprising a second retainer wall second side having a second retainer wall second side perimeter, said second retainer configured to mate with said first retainer;
  - a flexible sleeve, said flexible sleeve comprising a flexible sleeve first side and a flexible sleeve second side, said flexible sleeve further comprising a flexible sleeve first end having a flexible sleeve first end perimeter, said flexible sleeve further comprising a flexible sleeve second end having a flexible sleeve second end perimeter, said flexible sleeve first end perimeter fixedly interposed between said first retainer wall and said second retainer wall;
  - a flexible sleeve retainer strap in communication with said flexible sleeve second end, said flexible sleeve retainer strap further configured to alter a dimension of the flexible sleeve second end perimeter, said flexible sleeve retainer strap further comprising a first connector;
  - a monument strap fixedly attached to a monument fixture, said monument strap further comprising a second connector; and
  - wherein said first connector is configured to removably mate with said second connector.

19. The method of claim 18, further comprising:
preventing a moisture flow from passing through an aircraft cabin floor opening.

20. The method of claim 18, further comprising:
sealing the aircraft cabin floor opening by fixedly and removably attaching the flexible sleeve first end of the moisture dam assembly at a flexible sleeve first end/first retainer/second retainer interface at an aircraft cabin floor opening perimeter of the aircraft cabin floor through opening.

21. The method of claim 18, wherein said flexible sleeve first end perimeter is fixedly and removably interposed between said first retainer wall first side and said second retainer wall second side.

22. The method of claim 18, wherein said flexible sleeve first end perimeter is fixedly and removably interposed between said first retainer wall second side and said second retainer wall first side.

* * * * *